March 10, 1959 J. F. ARMSTRONG 2,876,758
STARTER CONTROLLED PRIMING SYSTEM FOR A FUEL INJECTION
OPERATED INTERNAL COMBUSTION ENGINE
Filed Nov. 19, 1956 12 Sheets-Sheet 1
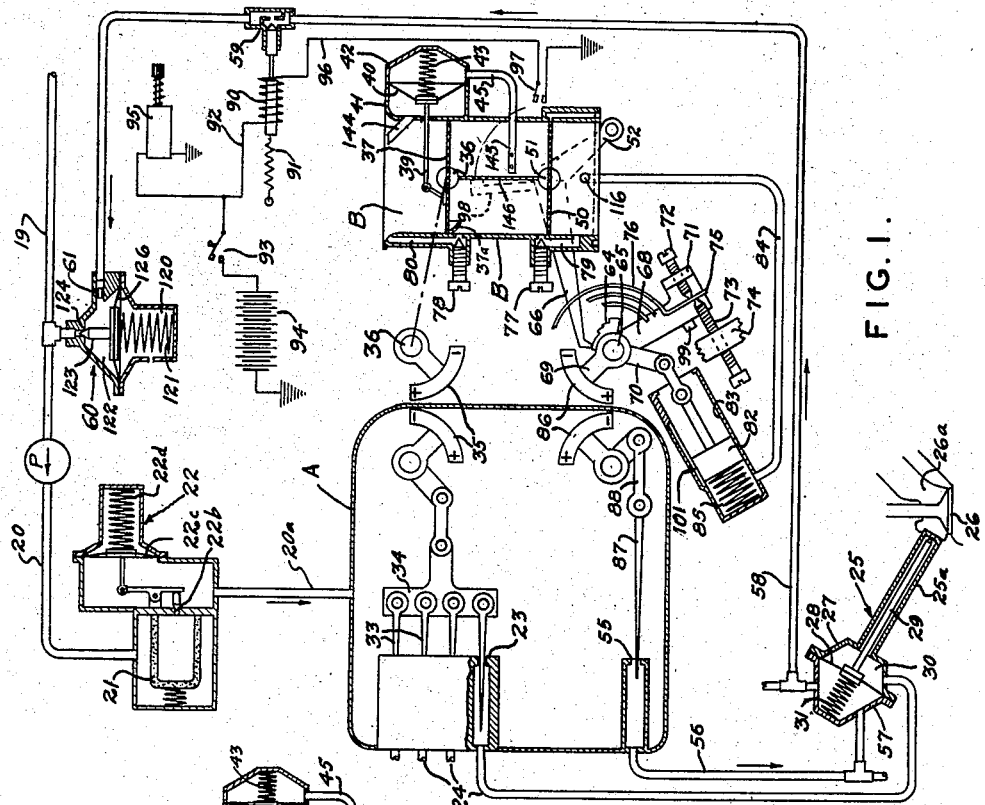
INVENTOR.
JAMES FRED ARMSTRONG
BY Bertram H. Mann
ATTORNEY

INVENTOR.
JAMES FRED ARMSTRONG
ATTORNEY

March 10, 1959

J. F. ARMSTRONG 2,876,758

STARTER CONTROLLED PRIMING SYSTEM FOR A FUEL INJECTION
OPERATED INTERNAL COMBUSTION ENGINE

Filed Nov. 19, 1956

INVENTOR.
JAMES FRED ARMSTRONG
BY
Bertram H. Mann
ATTORNEY

*INVENTOR.*
JAMES FRED ARMSTRONG
BY
*Bertram H. Mann*
ATTORNEY

INVENTOR.
JAMES FRED ARMSTRONG

ATTORNEY

March 10, 1959

J. F. ARMSTRONG 2,876,758

STARTER CONTROLLED PRIMING SYSTEM FOR A FUEL INJECTION
OPERATED INTERNAL COMBUSTION ENGINE

Filed Nov. 19, 1956

INVENTOR.
JAMES FRED ARMSTRONG
BY
Bertram H. Mann
ATTORNEY

March 10, 1959 J. F. ARMSTRONG 2,876,758
STARTER CONTROLLED PRIMING SYSTEM FOR A FUEL INJECTION
OPERATED INTERNAL COMBUSTION ENGINE
Filed Nov. 19, 1956 12 Sheets-Sheet 8

INVENTOR.
JAMES FRED ARMSTRONG
BY
Bertram H. Mann
ATTORNEY

March 10, 1959     J. F. ARMSTRONG     2,876,758
STARTER CONTROLLED PRIMING SYSTEM FOR A FUEL INJECTION
OPERATED INTERNAL COMBUSTION ENGINE
Filed Nov. 19, 1956     12 Sheets-Sheet 10

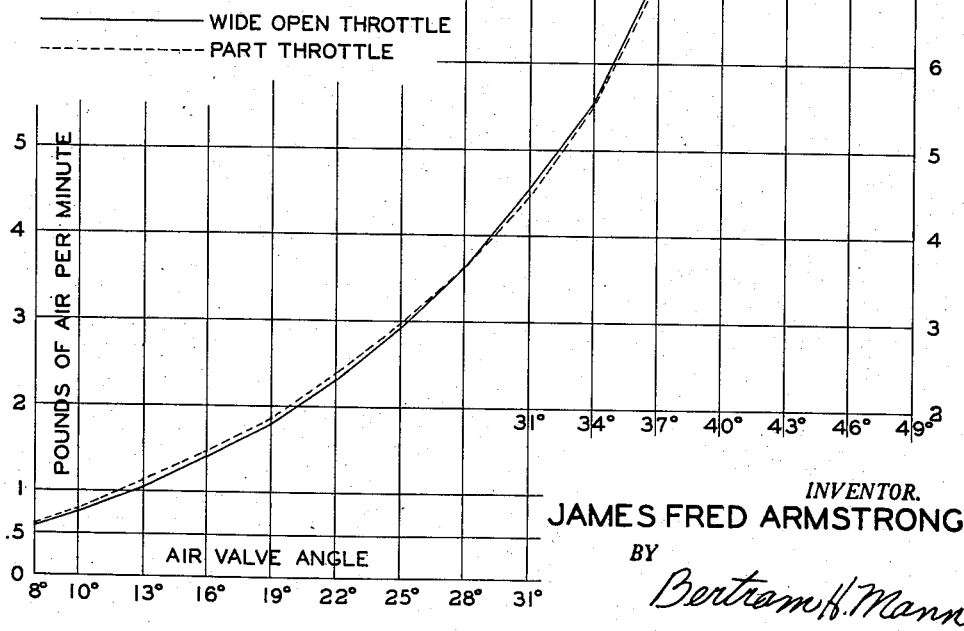

FIG. 23

| AIR VALVE ANGULAR OPENING | POUNDS AIR FLOW AT WIDE OPEN THROTTLE | POUNDS AIR FLOW AT PART THROTTLE | % VARIATION OF AIR FLOW PART THROTTLE TO WIDE OPEN THROTTLE |
|---|---|---|---|
| 8.8 | | .675 | |
| 8 | .573 | | |
| 10 | .756 | .784 | + 3½ |
| 13 | 1.037 | 1.112 | + 7 |
| 16 | 1.397 | 1.448 | + 4 |
| 19 | 1.807 | 1.846 | + 2 |
| 22 | 2.305 | 2.363 | + 2½ |
| 25 | 2.930 | 2.960 | + 1 |
| 28 | 3.670 | 3.667 | EVEN |
| 31 | 4.545 | 4.433 | − 2½ |
| 34 | 5.495 | 5.452 | − 1 |
| 37 | 7.080 | 7.010 | − 1 |
| 40 | 8.550 | 8.802 | + 3 |
| 43 | 10.18 | 11.01 | + 8 |
| 46 | 12.32 | 13.28 | + 8 |
| 49 | 14.76 | 14.97 | + 1½ |
| 52 | 17.03 | 16.11 | − 5½ |
| 55 | 19.36 | 17.68 | − 9½ |
| 58 | 20.79 | 18.71 | − 11 |
| 61 | 21.74 | 20.02 | − 8½ |
| 64 | 22.72 | 21.28 | − 7 |
| 67 | 24.00 | 23.07 | − 4 |
| 70 | 25.83 | 23.98 | − 8 |
| 73 | 27.76 | 26.07 | − 6½ |
| 76 | 29.55 | 26.78 | − 10½ |
| 79 | 31.63 | 27.50 | − 15 |
| 82 | 33.39 | 33.33 | EVEN |

——————— WIDE OPEN THROTTLE
--------------- PART THROTTLE

POUNDS OF AIR PER MINUTE

AIR VALVE ANGLE

INVENTOR.
JAMES FRED ARMSTRONG
BY
*Bertram H. Mann*
ATTORNEY

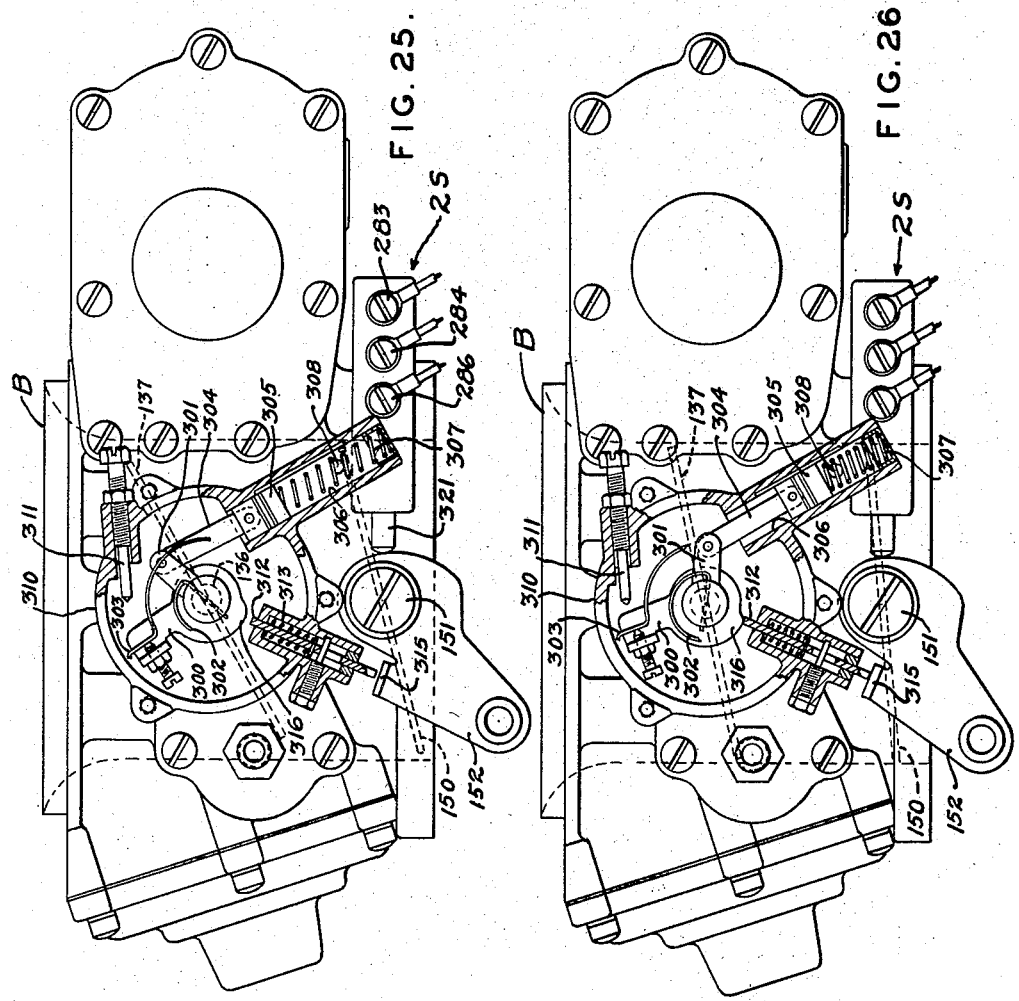

United States Patent Office 2,876,758
Patented Mar. 10, 1959

2,876,758

STARTER CONTROLLED PRIMING SYSTEM FOR A FUEL INJECTION OPERATED INTERNAL COMBUSTION ENGINE

James Fred Armstrong, St. Louis, Mo., assignor to ACF Industries, Incorporated, St. Louis, Mo., a corporation of New Jersey Application November 19, 1956, Serial No. 622,917

19 Claims. (Cl. 123—179)

This invention is an engine charging device using the continuous flow system in which the fuel is pressurized, measured under pressure in accordance with the engine requirements, and distributed under pressure to points adjacent the intake valves of the several cylinders of the engine. Such a system is shown in my prior application, Serial No. 516,358, filed June 20, 1955, now Patent No. 2,785,669 entitled "Injection Carburetion," of which this application is a continuation-in-part.

In order to perform these necessary functions in the intended manner, this charge forming device comprises a plurality of sensing means for engine fuel requirements, preferably responsive to the rate of airflow to the engine through the induction system, and engine pressures and temperatures for indicating the fuel requirements of the engine. These, in turn, control fuel metering means in passages supplied with fuel under pump pressure and delivering the metered fuel through separate branches to the engine to meet the needs of each engine combustion chamber.

This description will be limited to the system as applied to one group of cylinders or combustion chambers, but it is contemplated that the combination described, as well as its various parts or subcombinations of parts, have other applications in the general art of fuel feeding, since the same principles apply whether the fuel is supplied to one group or several groups of cylinders, or to one or more groups of burners.

By way of example, this invention is applied to a system illustrated herein which is identical with that described in my prior application, above identified, and is briefly described as follows:

In this system, the air for engine charging is manually controlled by a throttle valve, and the sensing means for indicating fuel requirements is responsive, either directly or indirectly, to indicate such variables as engine speed, engine load, and engine operating temperature. It should be understood that other indications can be taken, such as atmospheric pressure and temperature, to modify the response of the above described sensing means.

The response indications of the sensing means are, in turn, transmitted to control elements for varying the area of fuel metering orifices in the fuel metering part of the engine charging device. Fuel under pressure is fed to this fuel metering part of the device by a pump through a pressure regulator.

In the fuel metering part, the flow path of the fuel is divided into separately metered fuel distributing circuits connected to separately operate one or more differential pressure operated valves or nozzles discharging into the engine air induction system.

Each valve is urged open by the force due to the fuel pressure in one of these distributing circuits which delivers fuel for engine charging, and is urged closed by an opposing force due to the action of metered fuel flow into a distributing circuit creating a datum pressure or pressures. These forces act on the opposite side of a diaphragm in each differential pressure operated valve.

It will be readily recognized that this system differs basically from all prior systems in that the fuel metering is performed simultaneously with the flow dividing.

Some, if not all, of the advantages to be gained from the arrangement of elements in this system may be realized by a recognition of the basic principles involved in their arrangement. Thus, in this system, the datum pressure determines the pressure downstream of the metering in the distributing circuit for engine charging fuel. Both this fuel circuit and the distributing circuit for datum pressure are connected to the same pressure source, and fuel flow to both circuits is metered in the same manner. It follows, therefore, that the pressure drop from the source of pressure into the datum circuit determines the pressure drop across the fuel metering orifices from the pressure source into the distributing circuit for engine charging fuel. The datum pressure distributing circuit has a controlled inlet and outlet, one of which is variable, to establish therebetween a definite fuel pressure. When suitably adjusted, small fluctuations in pressure at the source will produce similar pressure fluctuations in the datum pressure circuit. This effect is transmitted to the nozzle valves, above described, which control the pressure drop across the metering in the distributing circuit for engine charging fuel, and tends to maintain the pressure drop constant and the flow therethrough uniform.

It is known that fuel flow will vary directly with variations in orifice area when the pressure drop across the orifice is held substantially constant and the flow co-efficient of the orifice does not change. Because of this principle, fuel flow in the branches of the distributing circuit for engine charging fuel will vary directly with area changes in the metering orifice to each.

The area of the orifices is controlled by suitably contoured metering rods supported for movement in unison by a carriage so that all of the orifice areas are varied simultaneously and equally, causing the flow in each branch to be equal. The position of the carriage is controlled by the indications transmitted from an airflow sensing device in the air induction system of the engine. This device is a balanced air valve operated by a servo-motor which derives its power from the pressure drop across the valve. Alternatively, the carriage may be positioned by engine speed combined with throttle opening, which are variables determining the rate of airflow to the engine. These metering rods are enclosed within a fuel pressure container and transmission of movement between the sensing means and the rods is also by means of a magnetic clutch.

The advantages of this type of system have been enumerated in the disclosure of the parent case, above referred to, and will not be repeated here. Thus, the instant application is directed to a modified form of the prior system, as well as elements of that system.

This application discloses improvements in both the airflow measuring and the fuel measuring systems of the device which cooperate to obtain an overall improved performance. The airflow measuring device or balanced air valve has been improved by changes in the valve itself, as well as the position and operation of the air pressure sensing means for operating the servomotor connected to the valve. These changes result in more positive operation of the valve to obtain a more positive and uniform response in both the full-throttle and part-throttle conditions of operation.

According to this modification, starting enrichment of the fuel mixture is obtained by engine temperature responsive means which modifies the position of the airflow measuring device, rather than the datum pressure, as in prior construction.

According to this invention, a means is provided in the fuel part of the system so as to obtain a quick fuel cut-off to the engine when the fuel pump, which may be driven therefrom, stops running.

According to this invention, engine priming is obtained, regardless of temperature, to facilitate engine starting.

According to this invention, the fuel system has been modified to obtain throttle operated engine unloading, which is more positive.

According to this invention, the above features, including engine priming, fuel cut-off, and engine unloading, have been combined in a single control valve device located in the datum system.

According to this invention, each of the fuel nozzles is so constructed as to cooperate in obtaining flow characteristics suitable to handle the wide variation in fuel flows. These modifications result, incidentally, in a nozzle which has a self-cleaning action.

This system, as disclosed, has several features, as above described, which may take various forms. By way of example, one of these forms is illustrated both schematically and structurally in the accompanying drawings, in which:

Fig. 1 is a schematic showing of the basic engine charging system illustrating the parts of the system in the positions assumed at engine idling speeds and normal operating temperatures.

Fig. 2 illustrates schematically the position of the parts of the flow sensing means during part-throttle operation at normal operating temperatures and heavy engine load.

Figs. 23 and 24 are, respectively, the lower and upper parts of a graph showing angular deflection of the air valve plotted against airflow in pounds per minute.

Fig. 25 is a side view of the air horn, partly sectioned, showing a structural embodiment of the mechanism schematically illustrated in Fig. 8 in cold starting position.

Fig. 26 is a similar view showing the relative position of the parts of the mechanism after the engine starts with the throttle in the fast idle position.

Air induction system

Figure 3:
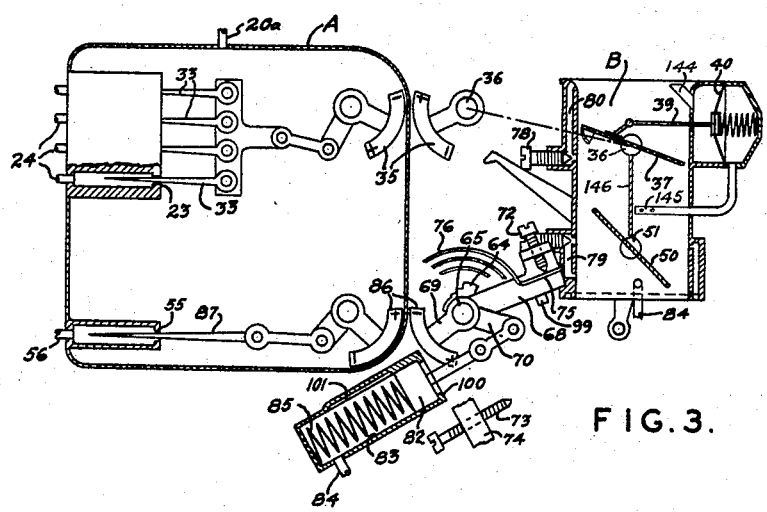
Fig. 3 shows the parts of this system during part-throttle operation at engine temperatures below normal.

Figs. 1 to 7 of the drawings schematically illustrate one form of an engine charge forming device embodying the above described system. For the purpose of convenience in illustration, the fuel metering system A and the air induction system B are shown separately.

The air induction system B has a single air conduit body through which all of the charging air passes to a plurality of branches connecting with the cylinder intake ports of the engine 26a, one of which is shown in Fig. 1. Each port 26a is separately controlled by an engine intake valve 26, all in a well known manner.

Airflow sensing device

Within the air conduit body B is a balanced butterfly air valve 37 mounted on a shaft 36 journaled for rotation in the side walls of the air conduit body. Mounted on one side of the air conduit body is a housing which is divided into a pair of chambers 41 and 42 by a diaphragm 40. Chamber 41 is connected with air conduit B through a vent tube 144 in the wall thereof anterior of the air valve 37 and facing upstream. A passage 45 connects the opposite chamber 42 with the Pitot tube 145 located in the air conduit B posterior or downstream of the air valve 37. This air horn structure is shown in detail by Figs. 9–13. The rod 39, projecting through the wall of the air conduit B, interconnects the air valve 37 and the diaphragm 40 in such a manner that pressures acting on the diaphragm will position the valve 37 angularly in response to the pressures sensed on opposite sides of the valve through the vent tube 144 and the Pitot tube 145. Details of construction and mounting of Pitot tube 145 will be described hereinafter in more detail. A spring 43 calibrated to give the proper resistance urges the valve to the closed position. The rod 39 is contoured to move through the slot 39a and fits closely to prevent leakage.

In order to provide for some adjustment of the angular indications of the valve 37 in response to these variable pressures, air conduit B is provided with a by-pass 180 (Fig. 8) and an adjustable metering screw 178. By adjusting the capacity of the by-pass 180, the indications of the air valve 37 to the rate of airflow can be changed to suit the calibration of the metering means for fuel which it controls. Because of the location of the inlet of the by-pass, it can operate only in the initial range of open positions for the air valve.

Below the air valve 37 is a manually operated throttle valve 50 mounted on a shaft 51 journaled in the walls of the conduit B. Operating lever 52 is secured to shaft 51 and provides for attachment of the usual manual control for the operator of the motor vehicle. This can be, and usually is, an accelerator pedal T.

Extending between and parallel to the valve shafts 36 and 51 is a partition 146 which is slotted transversely parallel to shaft 51 as shown at 149. The partition is mounted in slots 147 and 148 in the wall of the air horn B, which extend between the journal bearings in the wall thereof and to the opening in the air horn. This permits assembly of the partition or baffle by sliding it into place before the valve shaft 51 is inserted into its journals in the air horn body B.

Figure 11:
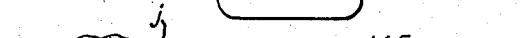
Figs. 11 and 12 are longitudinal sections, on an enlarged scale, through the combined valve and Pitot tube shown in Fig. 10.
Figure 12:
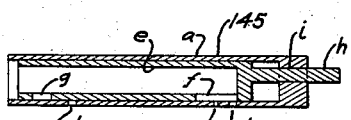

Fig. 11 illustrates the details of the Pitot tube 145. Passage 45 leading to chamber 42 mounts an outer tube member a which has a plurality of ports b, c, and d facing downstream. Within the tube is a slidable sleeve valve *e* with slots *f* and *g*. An actuating pin *h* on the end of the sleeve valve *e* is slidably received in the aperture *i* in the closed end of the tube member *a*. It will be noted that the actuating pin *h* is eccentric to prevent relative rotation between the sleeve and the tube. A spring *j* retains the two parts in the position shown in Fig. 11.

Figure 10:
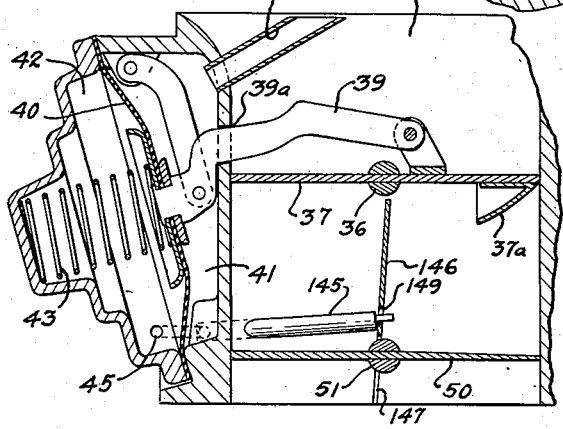
Fig. 10 is a vertical section through the air horn showing a modified form of the air valve and its Pitot tube control.
Figure 13:
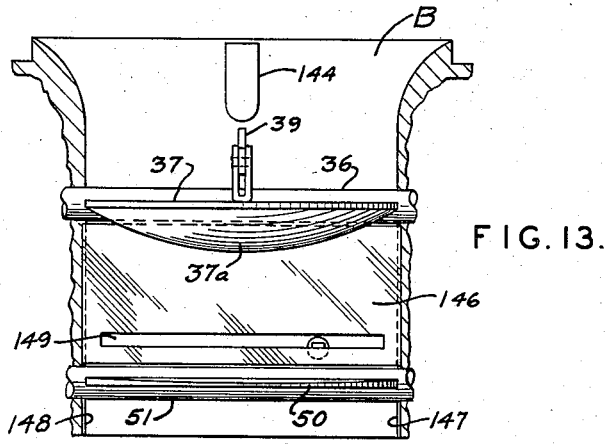
Fig. 13 is a vertical section of the air horn taken at substantially right angles to the section illustrated in Fig. 10.

Both the throttle and air valve open by rotation in a counterclockwise direction as viewed in Fig. 10. As the throttle approaches final open position, it engages actuator pin *h* and moves sleeve valve *e* from the position shown in Fig. 11 to the position shown in Fig. 12.

In the part-throttle range of operation, then, ports *b* and *d* are open, but as the throttle moves to the full-open, port *d* is gradually closed, and port *c* is gradually opened.

Air valve 37 also opens by rotation in a counterclockwise direction. As viewed in Fig. 10, the right-hand side of the valve is regarded as its leading edge relative to airflow direction. The left side would necessarily be the trailing edge. The same applies to the throttle. On the leading edge of the air valve 37 is a segmental shaped air deflector or spoiler 37a, the effect of which will be described hereinafter.

*Operation of airflow sensing device*

The diaphragm arrangement above described can be termed a servomotor which, in turn, receives its power from the pressure drop across the valve which it operates. According to present understanding, this pressure drop is at least in part a measure of the dynamic airflow around the valve. Of course, the object of this invention is to design a mechanism which supplies the correct amount of power to the servomotor to balance the valve in stable positions depending on the rate of airflow past the valve, and to do so without an excessive static pressure drop across the valve, which is detrimental to free breathing by the engine. To do this, it is necessary to apply exactly the right amount of power from the servomotor and compensate for the effect of throttle position on the airflow around the valve.

Figure 24:
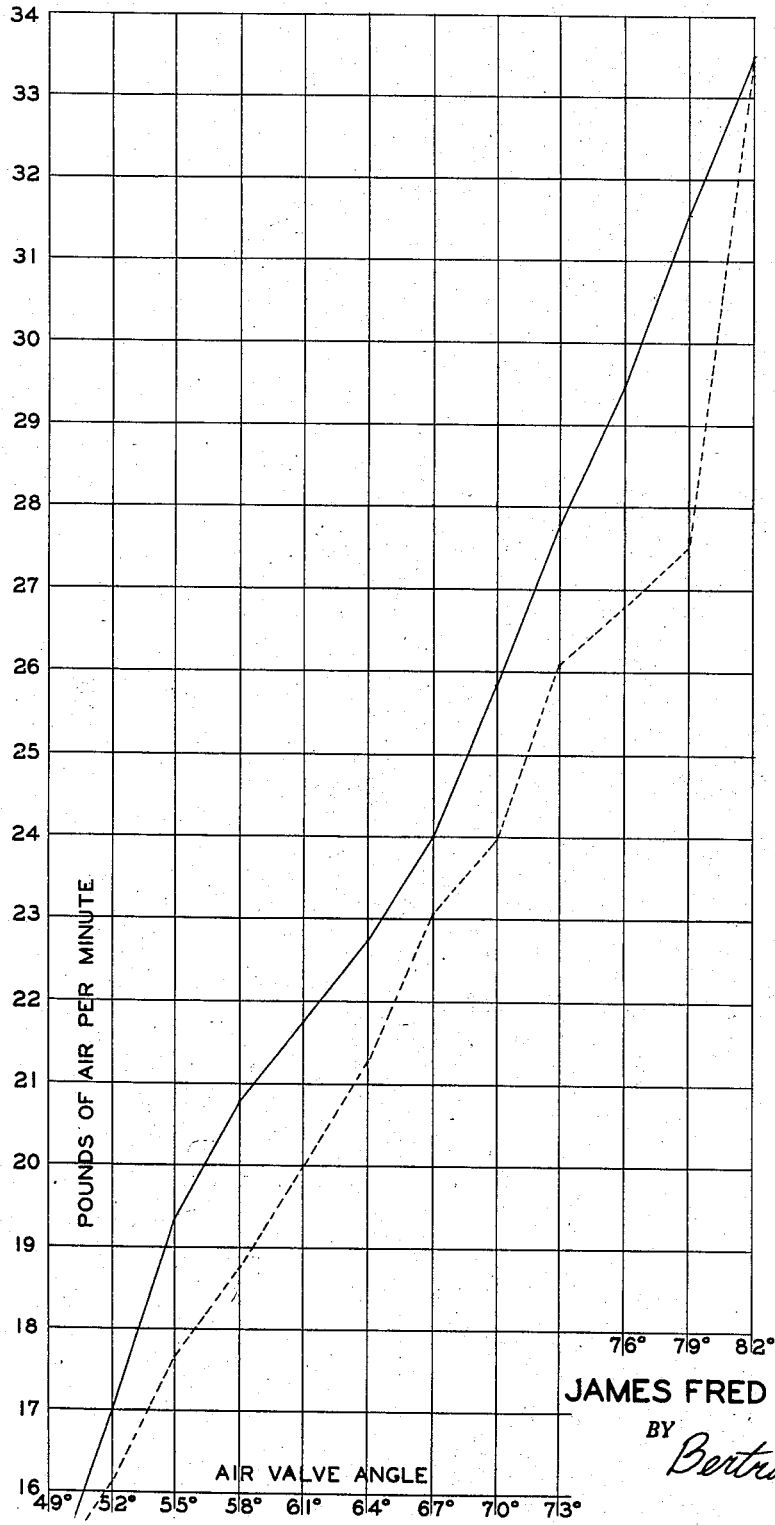

The structure illustrated and described herein is successful in every respect. Figs. 23 and 24 illustrate a pair of curves, one for full-throttle in full lines, and one for part-throttle in broken lines, from which the accuracy of the mechanism as a rate flow measuring device can be assessed. This result has been obtained with a pressure drop across the valve of approximately 7"H₂O maximum. So it can be seen that the device is far more efficient than a fixed orifice or venturi for measuring the rate of airflow.

The following explanation of operation is based upon known characteristics of this type of valve.

Starting with what has been discovered about balanced butterfly valves, reference is made to an article appearing in the technical journal "Instruments," December 1952, pages 1717, 1719 and 1761. According to the curves representing torque required to open and resist closing, it appears that the term "balanced" is entirely misleading. Actually, the torque curve increases uniformly up to 50° or 60° of opening, and then reverses. This degree of opening corresponds with an angle of attack with the airstream of about 30° or 40° or less, which would correspond roughly with an angle beyond which the airfoil is in a stalling attitude, aerodynamically speaking. It is presumed, therefore, that the decrease in torque generally occurs at angles of attack of 30° to 40° at which the airfoil, in this case a circular disk, is actually flying.

In order to compensate for this characteristic, the power of the servomotor, as well as the airfoil characteristics of the disk valve which cause it to fly, must be modified.

*Modification to air valve*

In Figs. 10-13, a mechanically balanced round air valve is shown with a deflector or spoiler mounted on the undersurface of the leading edge. The deflector has little effect on the airflow until the valve reaches an angle of opening of 55° or more. (See slope of fuel line curve at this point, Fig. 24.) From this point on up to about 67° it increases the effect of airflow tending to open the valve, or decreases the effect of airflow tending to close the valve, so as to flatten the torque curve. As the curves show, uniform increase in airflow is obtained with uniform increase in air valve opening. The deflector does two things: First, the airflow passing through the throat formed between the deflector outer surface and the wall attains a velocity sufficient to produce a distinct opening force on the valve by an effect similar to reflection. (Especially is this true between 55° and 67°. See Figs. 23 and 24.) This reflection effect accounts for the additional lift obtained by an airplane wing when close to the ground. Secondly, beyond 67° the valve tends naturally to seek a 0° angle of attack with respect to the airflow, and the deflector in this range produces an increasing moment of force tending to close the valve by unbalancing the airflow about the valve.

The deflector or spoiler can be accurately defined as a modification in valve shape which decreases the opening force which must be exerted on the valve by the servo-motor during part of the range, and increases the force necessary in another range. Expressed another way, it decreases the slope of the torque curve in one range and reverses the slope of the curve in the final range of open positions.

*Operation of slotted partition*

Where the air valve and throttle are located in close proximity, the throttle, when wide open, acts as a partition. To get the same effect in the part-throttle range, it is necessary to divide the flow by a partition 146 in order to obtain the same air valve position for the same airflow, regardless of throttle position. With or without a partition, the airflow around the trailing edge of the valve is greater than the airflow around the leading edge because the flow is smoother, especially when the throttle is in a partially open range of positions.

In this range of throttle positions, the pressure between the underside of the leading edge of the air valve and the top of the leading edge of the throttle is greater than that between the trailing edges of the valve and the throttle. The partition 146 alone does not cure this pressure condition, but it was discovered that an opening such as a slot has a beneficial effect. The slot appears to bleed off the pressure differences sufficiently to minimize the effect of this unbalance of pressures on the torque curve of the air valve, so that its response at part-throttle and at wide-open will be the same.

Of course, when the throttle moves to wide-open, the slot is closed, or nearly so, and its effect is eliminated when it is no longer necessary.

Furthermore, the partition isolates the flow on opposite sides of the air valve in any position of the throttle, so that pressure measurements can be made downstream of the trailing edge of the valve where it appears that the pressure variations are more regular and uniform when unaffected by the turbulent flow around the leading edge of the valve.

The slotted partition coacts with the air valve to modify its response to the rate of airflow. It can be considered as a stationary or fixed part of the airflow sensing means providing uniform air valve response independent of throttle position.

*Operation of Pitot tube*

The description so far has been confined to modifications in the air valve which apparently act to obtain a torque curve which is reasonably uniform and has a slope which is positive from closed to wide-open, independent of throttle valve position. Attention is now directed to the means for obtaining variable air pressure to power the servo-motor to balance the torque of the air valve and the reaction of return spring 43 in any position.

In part-throttle condition, the point of greatest suction appears to be adjacent the wall of the air horn at the trailing edge of the air valve. This is probably due to modulation of the pressure near the partition by the flow through the slot. Actually, there are two convergent streams—one off the top of the air valve and one off the top of the throttle. In the part-throttle position, port $d$ in the Pitot tube is open and the flow off the trailing edge of the air valve and throttle produce suction at this aspirating port due to velocity past the tube. Port $b$ is also open, but, being smaller, it merely has some modulating effect depending, of course, upon the degree of throttle opening and air flow. As the rate of airflow increases, suction at port $d$ will also increase to move the valve farther open.

At wide-open throttle, slot 149 is closed, when the suction is greater near the partition. Sleeve valve $e$ is moved by the throttle so as to close port $d$ and open port $c$ to give added port area in this zone of suction.

The valved Pitot tube is a means responsive to throttle position for controlling the source of power for operating the servo-motor. Thus it varies the degree and rate of response of the air valve depending upon throttle opening.

*Engine load and temperature sensing device*

Below the throttle 50 is a port 116 in the wall of the conduit B connected by a line 84 with a cylinder 83 below a piston 82 in the cylinder. Cylinder 83 is open at its upper end to a chamber (not shown) containing the thermostatic enrichment coil spring 76. This chamber is, in turn, connected to a source of engine heat. The difference in pressure on opposite sides of the piston 82 during the engine operation at idle and normal cruising speed of the vehicle causes the piston to assume the position shown in Fig. 1, compressing the spring 85 beneath the piston.

Figure 5:
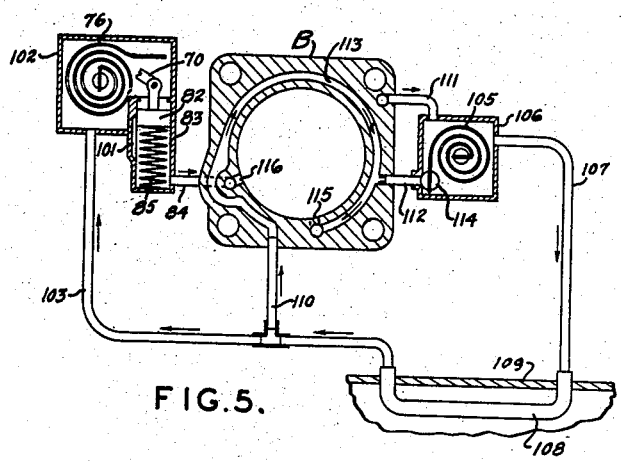
Fig. 5 is a schematic illustration of the de-icing structure, and illustrates the air conduit body in cross-section, the heating passages and the control for heated air positioned to supply heated air to the air conduit body.

This pressure difference also causes a continual flow of air from a source of heat 108 in Fig. 5 through the thermostat chamber enclosing the thermostatic enrichment coil spring 76 past the piston through the by-pass 101 and into the conduit B by way of line 84 extending to port 116.

Movements of the piston 82 within the cylinder 83 are communicated through a piston rod connected with a lever 70 to a shaft 65 upon which is mounted a lever 68 having an offset lug 71 threaded to receive adjusting screw 72. Thermostatic enrichment coil spring 76 has its inner end concentrically arranged with the shaft 65 and secured to some fixed portion within the chamber. Its outer end projects radially of the shaft 65 into abutting relation with the inner end of screw 72 and, at normal engine operating temperatures, contacts the inner end of screw 73 threadedly mounted within a fixed portion 74 of the chamber structure. The radial extension 75 also forms an abutment for the lug 99 on the lever 68.

This structure forms a sensing means connected with the air conduit B which will indicate by position of the shaft 65 the amount of load under which the engine is operating. Likewise, since the thermostat 76 is heated preferably from a source 108 on the engine, shaft 65 may also take up a position responsive to both engine load and engine temperature.

At normal engine load and normal engine temperatures, the parts will assume the position as shown in Fig. 1, with the piston 82 depressed and adjusting screws 73 and 72 engaging the radial extension 75 of the thermostat. As engine load increases, however, spring 85 will expand due to the decreasing force exerted on the piston 82 by the difference in pressure on its opposite sides. Movement of the piston in response to the spring engages the lug 99 with the radial extension 75 on the thermostat 76, thereby rotating the shaft 65 to a position indicating a change in the fuel requirements of the engine from part-load to full-load. The parts will then take the position shown in Fig. 2.

Figure 4:
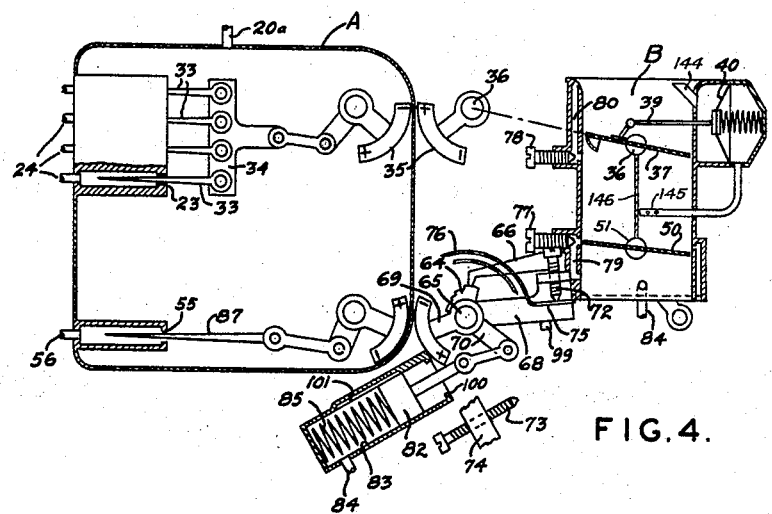
Fig. 4 shows the parts of the system in the position which they will assume at engine idling speeds and at engine temperatures below normal.

The construction of the thermostat 76 is such that decrease in temperature tends to rotate the radial extension 75 in a counterclockwise direction to a position such as shown in Fig. 3 and Fig. 4. This, in turn, produces an angular displacement of the lever 68 in the same direction, and rotation of the shaft 65 to another position or positions indicated by the engine temperature. Where, at the same time, the engine load is heavy, the position of the parts will be such as that indicated in Fig. 3, which illustrates the extreme displacement of the lever 68 in a counterclockwise direction, and similar movement of the shaft 65.

Where the engine load is light and engine temperature is low, the position of the parts is illustrated in Fig. 4, wherein the piston 82 has compressed the spring 85 to place the shaft 65 in a new position indicating light load at low temperature.

Shaft 65 also carries a fast idle cam 64 which cooperates with a finger on lever 66 secured to the manually operated throttle shaft 51 so as to open the throttle 50 slightly in Fig. 4 at low engine temperatures to increase engine idle speed.

Shaft 65 and its temperature and pressure control form a sensing means which will indicate by the position of the shaft 65 both load and temperature condition of operation for the engine, and indications of this sensing means are transmitted to the fuel metering system by the position of shaft 65.

Air conduit B has a by-pass 79 around the manual throttle 50 controlled by an adjusting screw 77. This control provides for regulating the air flowing past the manual throttle when in the idle positions. As will be readily recognized, screw 77 corresponds in function with the ordinary mixture regulation screw in the conventional carburetor.

*Fuel metering system*

As will be described hereinafter more fully, positions of the indicating means controlled by the sensing means are transmitted to position fuel metering mechanism within a fuel metering part indicated in the drawings as A. The fuel supply to the metering part A is by way of a line 19 from a suitable source of fuel to pump P, and thence, by way of line 20, to a pressure regulating device 22. Fuel entering the regulator passes first through a filtering element 21 to a control valve 22b operated by pressure downstream of the valve 22b acting on a diaphragm 22c against the resistance of a calibrated spring 22d. Suitable mechanism is provided for mechanically connecting the valve 22b to be operated by movements of the diaphragm under the influence of pressure of fuel downstream of the valve acting in one direction and atmospheric pressure and spring 22d acting in the opposite direction. Regulator 22 is preferably adjusted to deliver about thirty-five pounds of gauge pressure through the line 20a to the chamber enclosing the fuel metering part indicated as A. Because of features of the system which are inherent in the arrangement of valves and hydraulic circuits, it is not necessary that the pressure regulator 22 maintain a precisely constant pressure in the metering part of the metering chamber. Accurate metering does not depend upon accurate pressure regulation in this part of the system.

Within the fuel metering chamber A is a fuel charge control mechanism comprising one or more metering orifices 23 receiving one or more contoured metering rods 33 mounted on a carriage 34 for movement within the metering orifices 23. Each orifice 23 controls the flow to a separate fuel charging line 24 connecting at its opposite end to a fuel nozzle 25. Preferably, there are as many metering orifices 23, metering rods 33, and fuel charging lines 24 connecting with nozzles 25 as there are cylinders in the internal combustion engine, but it will be appreciated that alternative arrangements are possible wherein one metering orifice and rod may control the supply to one or more fuel nozzles 25. Likewise, the number of fuel nozzles 25 may vary from one to a number corresponding with each of the cylinders. Proper location of the fuel nozzles is a matter of choice in order to obtain good fuel distribution between the several cylinders of the engine. Fuel metered through the orifices 23 into the line or lines 24 is eventually fed directly to the induction system of the engine from fuel nozzles 25. Consequently, these elements form the distributing circuit for engine charging. The position of the carriage 34, and consequently the position of the metering rods 33, is determined by the position of shaft 36 through the magnetic clutch 35, one part of which will take a position indicated by the air valve 37 acting in response to engine air requirements.

Also within the fuel metering part A is a metering orifice 55 controlled by a metering rod 87. The position of this rod within the orifice determines the rate of flow from the chamber A to a distributing system for datum pressure. This circuit includes a plurality of lines interconnecting each of the fuel nozzles 25 and discharging through a line 58 and variable orifice 60 to the supply line 19. Fuel is supplied to this circuit from the metering orifice 55 through a connecting line 56 between the orifice and the lines of the distributing circuit.

The flow restriction 60 comprises a seat in the outlet controlled by a needle valve 123 actuated, in turn, by fuel pressure in the chamber 122 acting on the diaphragm 126 against the resistance of spring 121 and atmospheric pressure communicated to the chamber 120. Pressure in the distributing circuit for datum control is increased or decreased, as the case may be, by adjusting the area of the orifice 55 by rod 87. The larger the area of the orifice, the greater will be the datum pressure, and vice versa. In order to avoid the friction inherent in stuffing boxes, packing glands, and diaphragms, position of the needle 87 is controlled by a magnetic clutch which transmits the motion of the shaft 65 outside the fuel chamber A to the needle 87. The position of the shaft 65 indicates the response of the engine sensing means for load and engine operating temperature, as above described.

*Fuel nozzles*

Figure 17:
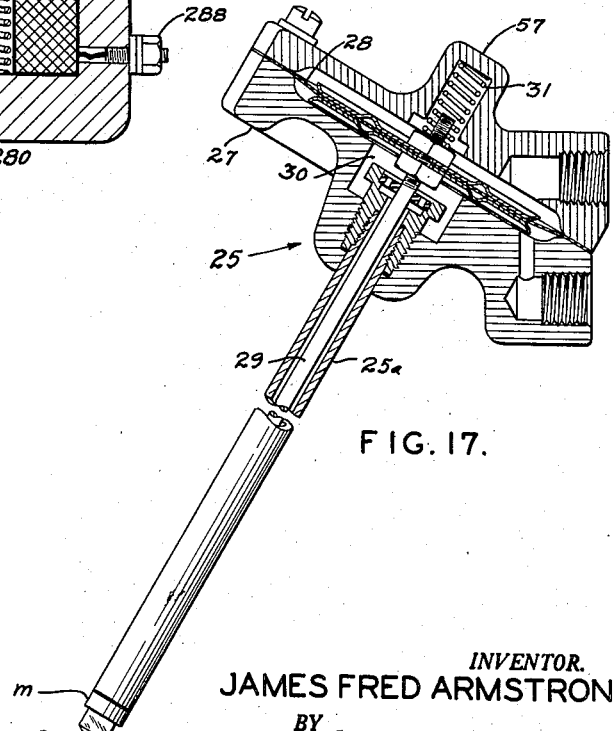
Fig. 17 is a side elevation, partly in section, illustrating one of the fuel nozzles used in the system of Fig. 1 or Fig. 8.

In a fuel feeding system using more than one fuel nozzle, the particular construction affords, not only uniform delivery between the nozzles, but also uniform fuel metering to each. The valve 25 in Fig. 17 has a casing 27 forming a chamber 30 at one end, and an extension 25a with a seat for the valve stem 29. The extension 25a is suitably secured in the engine cylinder head in a position to discharge adjacent the intake valve 26. Diaphragm 28 is secured to the stem 29 and forms a closure for the chamber 30. A cap 57 secures the diaphragm in place and houses a coil spring 31 urging the valve 29 on its seat. The diaphragm and spring control of the fuel nozzle control valve assembly is so designed that a difference of fuel pressure of about a half-pound on opposite sides of the diaphragm is necessary to unseat the valve 29. The spring 31 furnishes about one-sixth of the closing power on the valve.

In order to accommodate the fuel requirements of automobile engines of high horsepower it is necessary to vary the fuel delivery over a range possibly as great as thirty or forty to one. Generally speaking, a nozzle large enough in capacity to handle maximum rate of flow of fuel would not operate satisfactorily for small flows such as must be maintained to achieve a good, stable engine idle. At low speed, the fuel flow from the nozzle must be steady. It cannot come out in lumps and bunches, or a rough idle will result.

Figure 18:
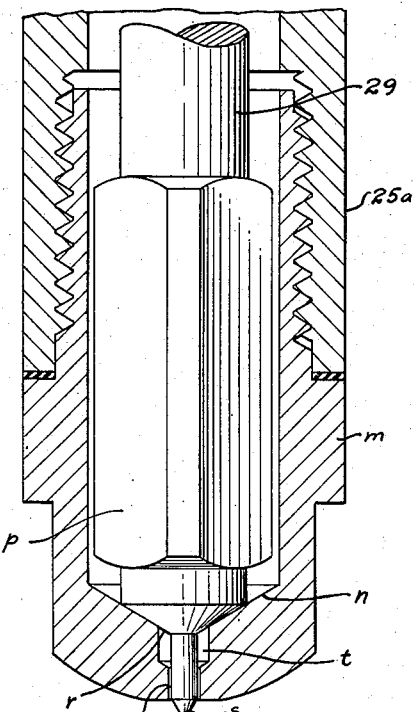
Figs. 18, 19 and 20 are vertical sections of the nozzle tip on an enlarged scale, illustrating the operational positions of the nozzle valve.
Figure 19:
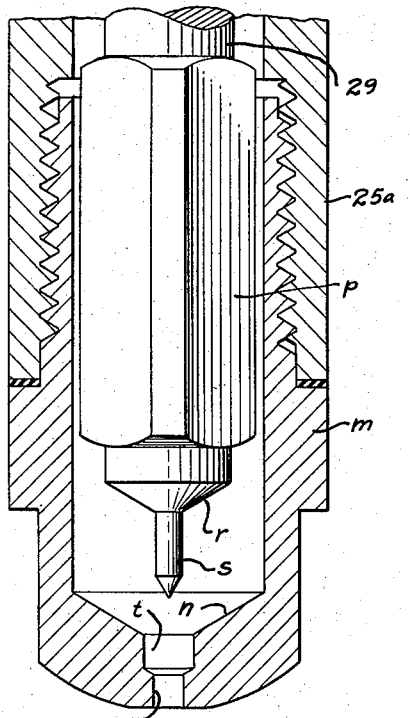
Figure 20:
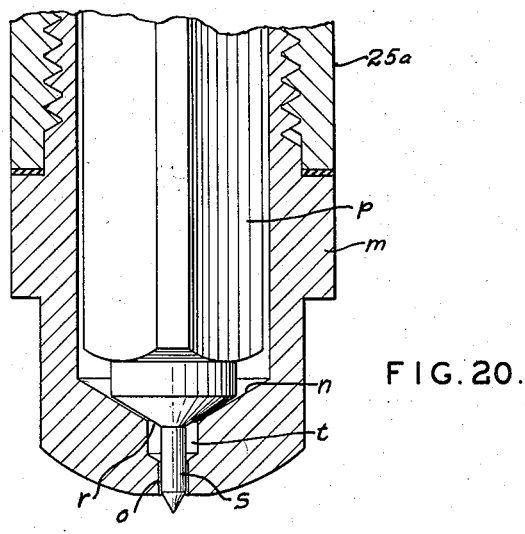

Figs. 18–20 illustrate on an enlarged scale the valve end of a nozzle and its operation. Within the tube 25a is slidably mounted a valve member generally indicated as 29. Threaded on the end of 25a is a tip or cap m formed with a valve seat n for a nozzle outlet o. Valve 29 has a triangular guide p for the valve face r and the pintle s which projects through nozzle o. The clearance between the pintle and nozzle is relatively critical at flows as low as three or four pounds of fuel per hour. The clearance should be about .001 to .002 of an inch. In a typical example a pintle of .0295" is used with an orifice of .031" id. by .030" long. The pointed end of the pintle has a 50° included angle. Chamber t has a bore of .0465" and a depth of .035". This relationship appears fairly critical.

Fig. 18 shows the position of the parts when the valve r is on its seat and the fuel cut off.

Fig. 20 shows the position of the parts at minimum rates of flow such as occur when the engine idles. The close clearance between the pintle and the nozzle, together with their relative position, eliminates intermittent fuel flow by maintaining a constant pressure drop. As the pintle moves upwardly in the nozzle, it offers less resistance to fuel flow, but the decrease in resistance or increase in fuel flow is gradual, while the increase in flow capacity of the valve r increases rapidly. The pintle acts as a metering means for damping out sudden changes in the rate of flow produced by the valve action. At idle the orifice size is practically constant, and changes in flow follow variations in pressure drop.

Actual testing of the nozzle has demonstrated its steady flow characteristics at low rates of flow. From these tests it appears that the fuel flows continuously, forming a hollow bubble of fluid adjacent the pintle end, which is continuously breaking up into a fine spray.

Fig. 19 shows the position of the nozzle parts at maximum flow with the pintle withdrawn from the nozzle to give maximum nozzle opening. Under these conditions, the metering is performed by variation in orifice area by the metering rods at a pressure drop determined by datum pressure. It will be appreciated that the movement of the pintle in the nozzle provides a self-cleaning action. It is difficult to imagine how a stoppage could occur since, at low rates of fuel flow to the nozzle, if the flow is either partially or fully stopped, the pintle would immediately be withdrawn due to the pressure increase on the diaphragm 28. The increase in size of the nozzle should pass any particle of foreign matter.

On the other hand, if the stoppage occurs at high rates of fuel flow when the pintle is fully withdrawn from the nozzle, then, when the engine and pump are shut off, the datum pressure is available to drive the pintle into the nozzle and force out the foreign matter.

Each line 24 in the distributing circuit for engine charging connects with each chamber 30 in each fuel nozzle, so that engine charging pressure is applied beneath the diaphragm 28 in a valve opening direction. Each chamber within cap 57 of the fuel nozzle control valve is, in turn, connected with the distributing circuit containing datum pressure, so that datum pressure in this chamber opposes movement of the valve 29 in the opening direction. This particular pressure acting to close the valve 29 is, in turn, determined as a function of the area of the metering orifice 55 by the position of the needle valve 87. Increases in area of the orifice 55 will be accompanied by increase in datum pressure, and this, in turn, decreases the pressure drop across orifices 23 in the distributing circuit for engine charging to decrease the flow of fuel to the engine regardless of the position of the metering rods 33.

Decrease in the area of the metering orifice 55 by movement of the rod 87 into the orifice decreases the datum pressure, and thereby the resistance of the valve 29 to opening, thereby increasing the pressure drop across the orifices 23 to increase the fuel flow to the distributing circuit for engine charging. It will be appreciated that datum pressure changes produce an inverse effect, increasing the pressure drop across the orifices 23 with decrease in datum pressure, and decreasing the pressure drop across the orifices 23 with increased datum pressure. Because the flow across the orifices 23 will vary directly with the pressure drop, other things being constant, then it becomes apparent that the sensing means for engine load and temperature, which determines the datum pressure, will have an indirect control through its own hydraulic linkage with the fuel nozzle 25 to vary the fuel delivered to the engine.

Where there are a multiplicity of fuel nozzles 25, each is connected to the datum pressure distributing circuit, and, due to this hydraulic interconnection, there will be a positive force acting on each diaphragm which is substantially equal in each nozzle.

The second function performed by the fuel nozzle control valve is that of maintaining a constant pressure drop between the distributing circuit for engine charging and the distributing circuit for datum pressure. As stated heretofore, it requires approximately a half-pound difference in pressures on opposite sides of the diaphragm 28 to open the valve 29. Any increase in this difference in pressure due to increases in pressure in the distributing circuit for engine charging will produce a displacement of the valve 29 in an opening direction so as to restore the pressure difference by increasing the discharge from the fuel nozzle. Of course, the reverse of this action will take place, since any decrease in this pressure differential allows the valve 29 to close and decrease the flow.

Both orifices 23 and 55 are fed from the same pressure source, and it therefore becomes apparent that fluctuations in this pressure source will be reflected downstream of the orifices in proportional amounts. When these pressure fluctuations occur, there will be no effect upon the fuel discharge from the fuel nozzles, since this depends wholly upon the pressure difference between the lines in the distributing circuits for engine charging and datum pressure. Likewise, since the flow from the nozzles remains unaffected, it follows that the pressure drop across the orifices 23 remains a constant for any given position of the needle valve 87 regulating datum pressure, and the entire fuel feeding system will remain in balance due to the fact that the fuel nozzle control valve assemblies regulate the pressure downstream of the orifices 23 to maintain a constant pressure drop therein.

Unlike prior systems, no attempt is made to hold the pressure upstream of the metering devices constant by a valved by-pass connecting opposite sides of the orifices. The defect in such systems is apparent because a pressure change must occur downstream before correction can be made upstream of the orifice. It follows that the metered flow must change before correction is made.

The datum pressure distributing circuit described herein amounts to a by-pass, but its function in the combination is distinct from that in prior devices in this respect. It is not primarily intended to function as a pressure regulator for the chamber enclosing metering part A. Such an effect, if any, is merely incidental in its operation.

*Engine temperature and de-icing circuit*

Figure 6:
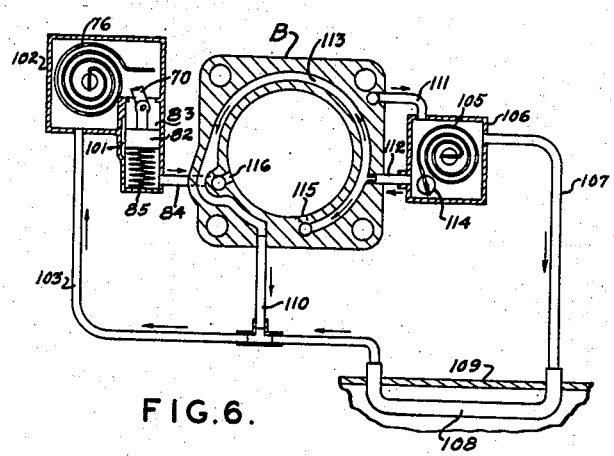
Fig. 6 illustrates the de-icing structure with the controls in a position to by-pass the heated air around the air conduit body passages.
Figure 7:
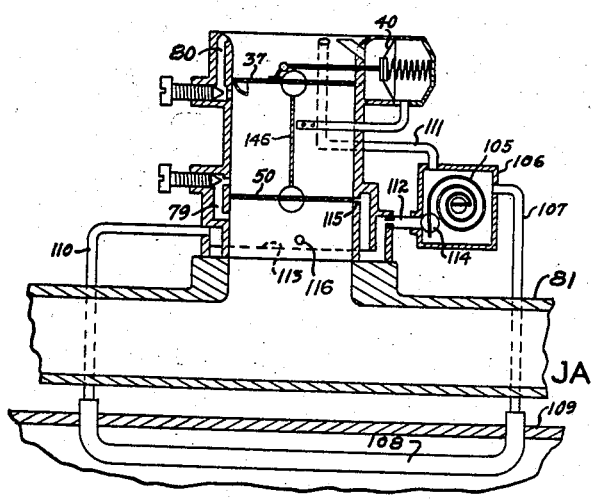
Fig. 7 is an elevational view in section of the heating circuit schematically illustrated in Figs. 5 and 6.

Figs. 5 to 7, inclusive, are views illustrating schematically in horizontal and vertical section the system for operating the engine temperature sensing thermostat 76 combined with a system for applying heat adjacent the manual throttle 50 to avoid icing. In this heating system, a port adjacent the entrance to the air conduit body is connected by a line 111 with a chamber 106 containing a thermostat 105 operating a valve 114 for closing a by-pass passage 112. Chamber 106 is connected by a line 107 with a heater 108 disposed within the water jacket or exhaust manifold 109 of the engine. The heater is connected by way of branch passages 103 and 110 to the thermostat chamber 102 and the passage 113 within the air conduit body B. Chamber 102 contains thermostat 76 and also the piston 82 operating in the cylinder 83 which, in turn, connects with an arm 70 on shaft 65 (not shown). A by-pass 101 controlled by the position of the piston 82 interconnects the chamber 102 with the line 84 leading to a port 116 in the air conduit body B posterior of the throttle 50. The operation of the thermostat and piston as an engine temperature and load sensing means has already been described and will not be repeated here except insofar as to explain the response of thermostat 76 to engine temperature.

Passage 113, which also receives heated air, is located adjacent the edge of throttle 50, and discharges through a port 115 at the edge of the throttle.

Fig. 5 illustrates the position of the parts when the engine is cold. During this engine condition, thermostat 105 is uncoiled, closing valve 114 and shutting off the by-pass line 112 communicating with the heating passage 113. Similarly, thermostat 76 is uncoiled, rotating the shaft 65 counterclockwise, and raising the piston 82 to its extreme upper position in the cylinder 83.

When the engine is started, suction at the port 116 will be sufficient under any condition of engine operation to cause piston 82 to compress spring 85 so as to open the by-pass passage 101 to some extent. Communication is then established from the port 116 to the chamber 102, and thence to heating element 108. The suction at port 116 will cause a flow of air into thermostat chamber 106 from line 111, and from thence into line 107, heater 108, and thermostat chamber 102. If the engine is operated with the throttle 50 slightly open, port 115 will be posterior of throttle 50, and suction at the port 115 will cause a flow of heated air through the line 110, passage 113, to the port 115.

Fig. 6 indicates the position of the parts during operation of the engine at normal temperatures. Under these conditions, under-hood temperatures will be sufficient to raise the temperature of the air entering the thermostat chamber 106 from the line 111, and thermostat 105 will respond to open the valve 114 to some degree. When this valve is open, the air flow from the chamber 106 will be divided between the line 107 and the line 112. Some of the air entering the chamber 106 will pass through heater 108, while the remainder will pass through line 112 to passage 113, where the flow will be divided again with some flowing directly to the port 115. The remainder circulates through the passage 113 to line 110 to mix with the heated air from the heater 108 passing through the line 103 to the thermostat chamber 102. This will modulate the heating effect on the thermostat 76 so as to prevent strain on the thermostat from overheating. Heated air from the chamber 102 passes through the cylinder 83 by way of by-pass 101 to the port 116. This will continually apply some heat to the thermostat 76 after the engine has reached normal operating temperatures.

*Fuel charge unloader*

Referring to Fig. 1, the unloader system provided for the fuel metering system has a valve 59 located in the datum pressure by-pass line 58 which is operated only at substantially wide-open throttle positions during the starter motor operation for cranking the engine. Valve 59 is maintained in the open and inoperative position by a spring 91, and closed on energization of a solenoid 90 connected by a line 92 between the starter switch 93 and the starting motor 95. The starting switch 93 is connected directly with the primary of a battery 94. The solenoid 90 is connected with ground through a line 96 connecting with unloader switch 97. This switch 97 is so located as to be closed by action of a lever 98 on the throttle shaft 51 when the throttle 50 is moved manually to nearly wide-open position.

With both switches 93 and 97 closed, the engine is cranked, and, simultaneously, valve 59 closes. As a result, datum pressure becomes equal to the charging pressure in the metering part A, and, since a half-pound differential or more is necessary to open the fuel nozzles 25, all fuel flow through the nozzles is prevented. This operation becomes necessary only in case the engine is flooded for some reason or other and the mixture too rich in the cylinders to be ignited. With the fuel supply shut off, air alone is pumped through the induction system, which will dilute the mixture in the engine cylinders, removing the excess fuel, so that the mixture in the cylinders becomes ignitable. As soon as the engine fires and starter switch 93 is open, the circuit will be broken, and valve 59 will open, due to the action of spring 91.

Operation

Fig. 3 illustrates the approximate position of the parts during cranking of the engine at low temperatures. With the throttle 50 partly open to admit sufficient air before starting, air valve 37 will assume some such position as illustrated at the cranking speed of the engine. The position of the valve 37 is indicated by shaft 36, which, in turn, is transmitted through the magnetic clutch 35 to correspondingly position the metering rods 33 in the orifices 23. This will open the orifices 23, and fuel pressure within the chamber A is communicated by way of these orifices to the distributing system for engine charging and fuel nozzles 25.

On the other hand, the temperature of the engine together with the lack of any suction below the throttle, permits the thermostatic enrichment coil 76 to unwind to its full extent. The position of the shaft 65 in response to thermostat action is transmitted through the magnetic clutch 86 to the datum pressure metering rod 87, which will substantially close the orifice 55. Datum pressure is thereby reduced and, accordingly, the pressure drop across the orifices 23 is correspondingly increased to increase the amount of fuel delivered from the fuel nozzles 25. A rich mixture suitable for starting the engine cold results.

Fig. 4 shows the position of the parts when the engine starts. After the engine starts and throttle valve 50 is closed, engine suction acts to compress spring 85 by forcing the piston 82 downwardly from its position shown in Fig. 3. This action, in turn, is transmitted to the shaft 65, arm 68, and adjusting screw 72, to wind up the thermostatic enrichment coil 76 until equilibrium is reached between the forces acting on piston 82 and the forces acting in the opposite direction in spring 85 and thermostatic enrichment coil 76 to give a suitable mixture during idling operation of the cold engine. In Fig. 4, arm 66 is displaced by cam 64 to crack the throttle 50 and increase engine speed during the warm-up. Of course, the balance in the system can be changed in order to give a full-rich mixture in case it is desirable to operate the engine at full load when cold. Under these conditions, the piston 82 would assume some position between that illustrated in Fig. 3 and that illustrated in Fig. 4.

The position of the parts during idling at normal temperatures is illustrated in Fig. 1, and a description of the operation under these conditions is believed unnecessary in view of the above remarks.

Fig. 2 illustrates operation of the engine at substantially full throttle under heavy load or full load conditions. The decrease in difference in pressure operating on opposite sides of the piston 82 allows spring 85 to rotate shaft 65, lever 68, until lug 99 abuts the radial extension 75 on the thermostatic enrichment coil. The position indicated by the shaft 65 is transmitted through the magnetic clutch 86 and move metering rod 87 into orifice 55, thereby increasing the pressure drop at this point. Since the corresponding effect will be had in the orifices 23, fuel flow is stepped up in the distributing system for engine charging to increase the fuel-air mixture ratio, and this will take effect regardless of the position of the metering rods 33. This automatic step-up arrangement can operate at any engine speed, and is useful through substantially the entire range of engine speeds to meet the fuel requirements of full engine load.

Air induction system

Figure 8:
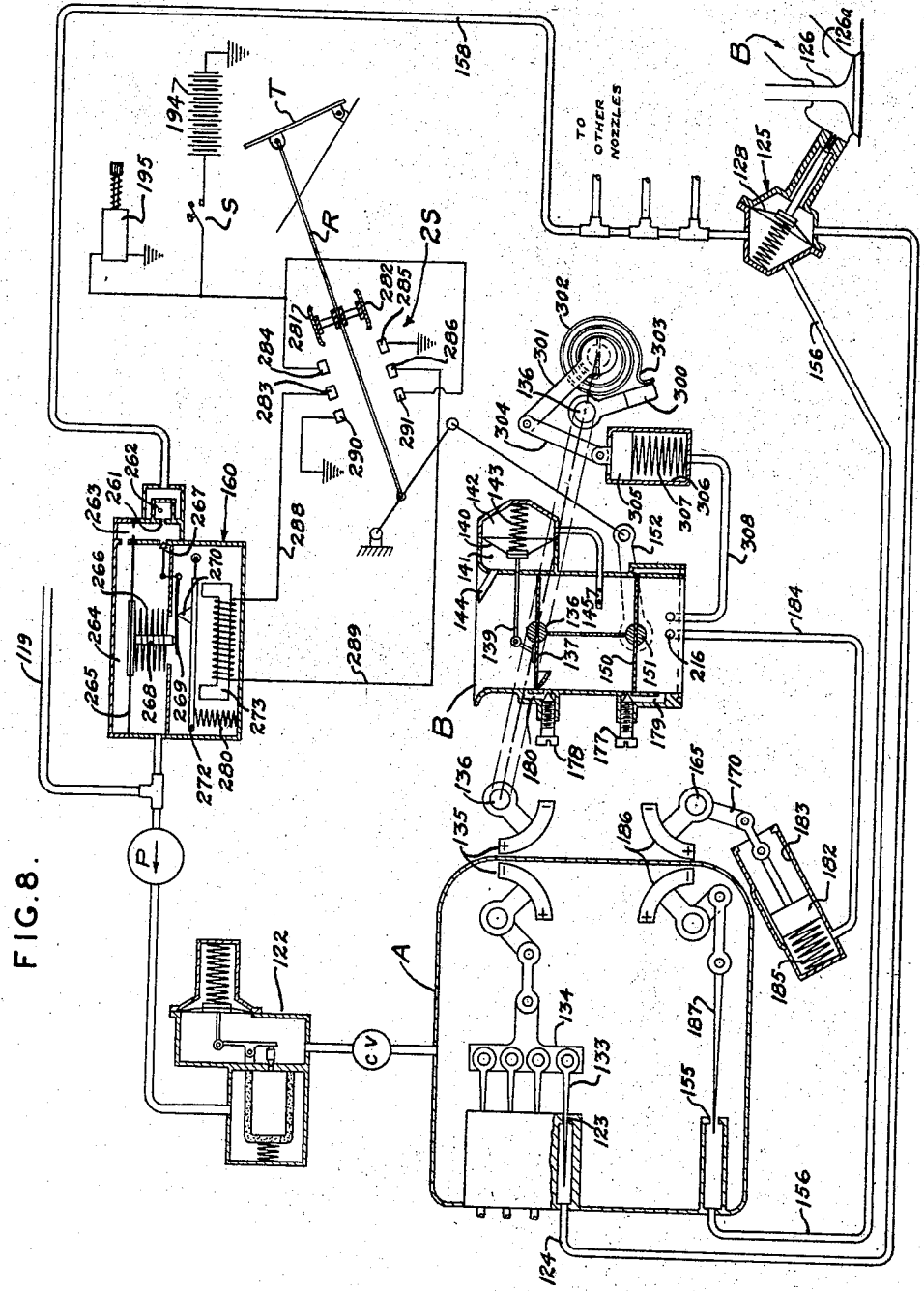
Fig. 8 is a schematic showing of a modification of the engine charging system illustrated in Fig. 1, showing the parts of the system in the positions assumed when the engine is stopped and the pump is not running.
Figure 9:
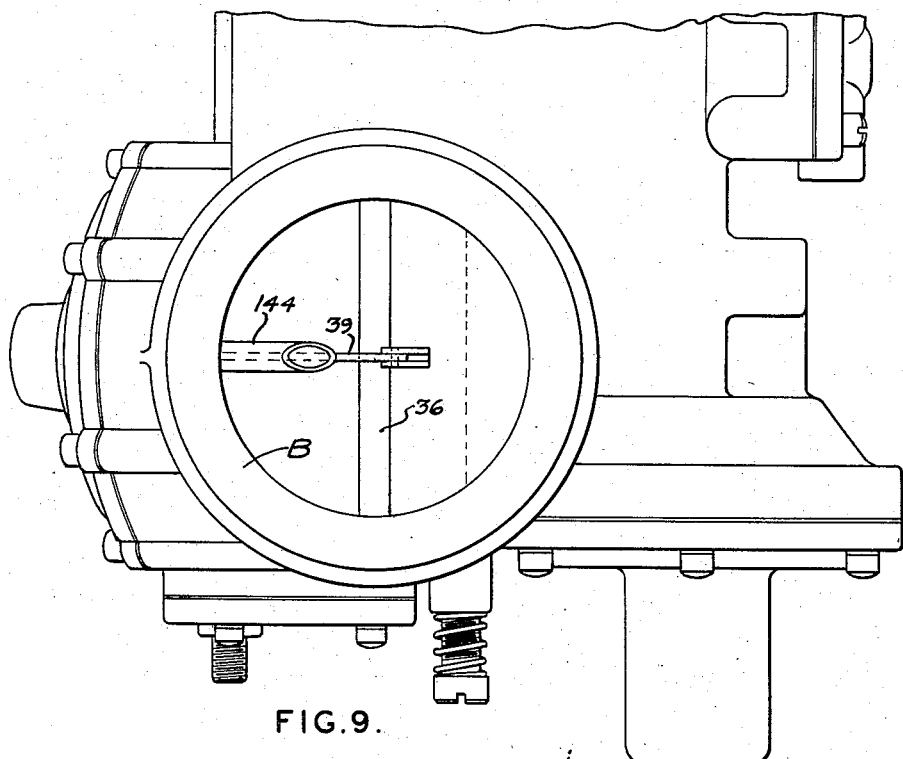
Fig. 9 is a top plan view of a structure which includes the air and fuel metering means schematically illustrated in Fig. 1 and Fig. 8. This unit is identical with that shown in Fig. 8 of my prior application, Serial No. 516,358, filed June 20, 1955, except for the details of the air valve illustrated herein.

Fig. 8 of the drawings schematically illustrates another form of an engine charge forming device which can be termed a modification of the form heretofore described in Figs. 1 to 7. (Likewise parts in all views are indicated by the same reference characters plus 100, 200, or 300, where possible.)

Like the former modification, the air induction system B has a single air conduit body through which all of the charging air passes to a plurality of branches connecting with the cylinder intake ports of the engine 126a, one of which is shown in Fig. 8. Each port 126a is separately controlled by an engine intake valve 126, all in a known manner.

Airflow sensing device

Within the air conduit B is a balanced butterfly air valve 137 mounted on a shaft 136 journaled for rotation in the side walls of the air conduit body B. Mounted on one side of the air conduit body is a housing which is divided into a pair of chambers 141 and 142 by a diaphragm 140. Chamber 141 is connected with air conduit B through a vent tube 144 in the wall thereof anterior of the air valve 137. A tube connects the opposite chamber 142 with a Pitot tube 145 located in the air-conduit B posterior or downstream of the air valve 137. The rod 139 interconnects the air valve 137 and the diaphragm 140 in such a manner that pressures acting on the diaphragm will position the valve 137 angularly in response to the pressures sensed on opposite sides of the valve through the vent tube 144 and the pitot tube 145. Details of the construction and operation are shown in Figs. 9–13 and explained heretofore. A repetition of this matter is not deemed necessary for a full understanding of the invention.

Below the air valve 137 is a manually controlled throttle valve 150 mounted on a shaft 151 journaled in the walls of the conduit B. Operating lever 152 is secured to shaft 151 and provides for attachment of the usual manual control, in this case accelerator pedal T.

Engine load sensing device

Below the throttle 150 is a port 216 in the wall of the air conduit B connected by a line 184 with a cylinder 183 below a piston 182 in the cylinder. Cylinder 183 is open at its upper end to atmospheric pressure. The difference in pressure on opposite sides of the piston 182 during engine operation at idle and normal cruising speeds of the vehicle causes the piston to assume the position shown in Fig. 1, compressing the spring 185 beneath the piston.

Movements of the piston 182 within the cylinder 183 are communicated through a piston rod connecting directly with the lever 170 to a shaft 165 which, in turn, carries one half of a magnetic clutch 186 which, in turn, effects the action of the fuel metering system hereinafter described.

When the engine loads are heavy, suction at the port 216 decreases, and spring 185 overcomes the force of suction on the piston 182, so as to move the piston to the outer end of the cylinder and rotate the shaft 165 in a counterclockwise direction.

Air conduit B also has a by-pass 179 around the manual throttle 150 controlled by an adjusting screw 177. This control provides for regulating the airflow past the manual throttle when in the closed position. As will be readily recognized, screw 177 corresponds in function with the ordinary idle speed regulation screw in the conventional carburetor.

Fuel metering system with modifications

As will be described more fully hereinafter, positions of the indicator or movable part operated by the several sensing means above described are transmitted to position fuel metering mechanism within a fuel metering part indicated in the drawings as A. It should be noted that the parts of the system which correspond with that heretofore described are given the same reference characters preceded by 100. The same or similar reference characters have been used throughout the application to identify similar parts in this application with one another, as well as with similar parts in my prior application, above identified, of which this application is a continuation-in-part.

This description of the fuel metering part of the system will be confined to the difference between this and my prior systems.

As shown in Fig. 8, fuel is supplied to the system through conduit 119 to a pump P through pressure regulator 122 and a check valve into the chamber A. If the pump P is of the type having an outlet valve, the check valve CV may not be necessary.

The arrangement of metering rods 133 on carrier 134 for movement in orifices 123, as well as the fuel distributing system 124 to the nozzles 125, is the same as above described. Likewise, the datum pressure circuit, including metering rod 187 in restriction 155, supplying the lines 156 and 158 in the circuit, is as above described.

This description will, accordingly, be restricted to the construction and operation of the pressure regulating unit 160 in the datum pressure outlet from the line 158, which differs from the corresponding unit 60 in my prior systems.

*Datum pressure regulator*

The datum pressure regulator 160 controls the discharge from the datum pressure line 158, and is connected between this line and the inlet of pump P. The rate of discharge from the line 158 during operation of the device is controlled by a centrifugal metering orifice 261, which has a tangentially arranged jet 262. Communicating with the orifice 261 is a fuel passage 263 leading to a chamber 264 closed by flexible diaphragm 265. The pressure of fuel in chamber 264 forces the diaphragm downwardly against the pressure of a suitably calibrated spring 266, which will maintain a pressure drop across the metering orifice 261 of about three or four pounds. That is, if the datum line pressure is, say 35 pounds, the spring 266 is so calibrated as to require a pressure of about 32 pounds to open the outlet valve 267 controlling a suitable outlet port between the jet 261 and the pump inlet.

During operation of the system, when the pressure in the chamber 264 exceeds the precalibrated pressure required, the stem 268 forces lever 269 downwardly against the resistance of spring 280 acting upwardly on the lever 269 at the point 270.

When the system is not in operation, such as when the engine is shut off, the pressure in chamber 264 is not sufficient to overcome the pressure of springs 266 and 280. Under these conditions, spring 266 will expand, forcing the fuel out of chamber 264 and back through the datum pressure line 158 toward the chamber A. The capacity of the chamber 264 is such that sufficient fuel will be forced backwardly through the line 158 to operate the diaphragms 128 in a direction to force the nozzle valves closed.

The pressure regulator 160, therefore, is a reservoir for sufficient fuel under pressure to loop all of the diaphragms 128 of all of the nozzles 125 in a direction to close the valves. This avoids a substantial pressure drop throughout the fuel distributing systems of the device when the pump P stops. It is presumed that pump P is either driven from the engine or operates only when the ignition circuit is energized.

Within the pressure regulator 160 is a movable armature 272 adjacent an electromagnet 273. The armature 272 is preferably a permanent magnet with north and south poles at its opposite ends. The electromagnet 273 is controlled by a circuit or circuits from switch 2S which are energized only during operation of the starter motor 195 from the battery 194 by the starter switch S.

These circuits, in turn, are controlled by a pair of sliding contacts 281 and 282 mounted on the rod R for operation from the accelerator pedal T. Sliding contact 281 is so arranged on the rod R that when the throttle is part-way open it connects contacts 283 and 284. At the same time, sliding contact 282 will connect contacts 285 and 286. Thus, when the starter switch S is closed, a circuit is completed from the positive side of the battery 194 through contacts 283 and 284 to line 288 through the electromagnet 273 to the line 289, and thus to ground through the contacts 286 and 285.

When the throttle is partly opened, therefore, electromagnet 273 is energized by a flow of current in the proper direction to attract the armature 272. This means that the direction of the current is such that the poles of the magnet 273 are opposite to the location of the poles in the armature 272. The attraction of the electromagnet 273 on the armature 272 compresses spring 280, thus decreasing the force acting to maintain the valve 267 closed. This increases the pressure drop across, and the flow through, metering orifice 261, lowering the pressure in the datum circuit 158 so as to increase the flow through each of the nozzles 125.

In this system, then, as the starter switch is operated, the accelerator pedal can be moved to partly open the throttle 150 which, in turn, closes the above described electric circuits to increase the fuel flow from each of the nozzles and thereby give a rich mixture for starting.

If the accelerator pedal T is fully depressed during cranking of the engine, when the switch S is closed, then contact 281 interconnects contact 283 and 290, while slider 282 interconnects contact 286 and 291. This, in turn, reverses the flow of current to the electromagnet 273, and, of course, reverses its polarity, so that, under these conditions, like poles of the armature 272 are opposite like poles of the electromagnet 273. The reaction is a force on the armature 272 acting in the same direction as the spring 280 to increase the closing force on the valve 267.

Under these conditions, the datum pressure will increase to be substantially equal with the charging pressure in lines 124 and flow from the individual nozzles 125 will stop. From this description it can be readily recognized that the pressure regulator 160, together with its control circuits, is responsive to throttle position to decrease or cut off the flow of fuel from the nozzles 125 when the engine is being cranked. Obviously, this will provide for an unloading function in case the engine has been flooded. The details of the actual construction of the pressure regulator 160 will be hereinafter described in connection with Figs. 14 through 16, inclusive. It should be clearly understood that the structure heretofore described with the pressure regulator 160 provides a starting enrichment regardless of engine temperature. However, in addition to this mechanism, the system includes additional means to increase the mixture ratio for cold starting and warm-up.

*Starting enrichment mechanism*

As schematically illustrated in Fig. 8, the air valve shaft 136 extends in one direction to one-half of a magnetic clutch 135 which, in turn, positions the carriage 134 in accordance with air valve position. The opposite end of the air valve shaft 136 extends outwardly and has secured thereto an arm 300. Pivotally mounted concentric with the shaft 136 is an arm 301 having a slotted hub receiving one end of a thermostat 302. This thermostat is of the type which winds up as the temperature decreases. It is, in addition, resilient, and acts like a torsion spring, so that decreasing temperature brings the outer end of the thermostat 303 into contact with the arm 300, applying thereto a resilient force acting in an opening direction on valve 137 in opposition to the force of spring 143.

The amount of force applied to the lever 300 by the end 303 of the thermostat depends, of course, upon engine temperature, and increases as the temperature decreases.

Attached to arm 301 is a link 304 connected with piston 305 in cylinder 306. Beneath the piston is a spring 307. Cylinder 306 is open to atmospheric pressure at one end and is connected at the opposite end beneath the piston 305 with the air induction system of the engine by a tube 308 opening below the throttle valve 150.

The thermostat 302 is connected with a suitable source of heat on the engine. This source may be either a water jacket or a system such as heretofore described which derives its heat from a stove in the exhaust system of the engine.

If the engine is not operating, its temperature will gradually decrease, and, if this decrease is to the point where a mixture enrichment is necessary, then the coil 302 reacts accordingly so that the end 303 exerts a pressure upon the lever 300 to rotate the lever 300 in a clockwise direction, opening the air valve 137. The air valve will come to rest at some open position where the force of the thermostat end 303 is balanced by the spring 143 in the servo-motor. The degree of opening of the air valve will, of course, depend upon the temperature of the thermostat 302, as well as the rate of air flow, and this degree of opening will determine the position of the metering rods 133 in the metering orifices 123, and thereby the amount of increase in fuel flow when the engine is cranked and the pump P in operation.

After the engine starts, the piston 305 is pulled downwardly against the pressure of spring 306, thereby decreasing the force exerted by the thermostat 302 on the arm 300. This decreases the percentage of mixture enrichment after the engine starts to run, because the force of the spring 143 will be increased an amount equal to the decrease in force exerted by the thermostat 302. It should be understood that the effect of the thermostat on the operation of the air valve can be, under very low temperatures, a modification of the servo-motor action on the air valve throughout the entire operating range of the air valve.

Details of the actual construction of the starting enrichment device above described will be more fully explained hereinafter with reference to Figs. 25 and 26.

*Constructional details of the pressure regulator*

Figure 14:
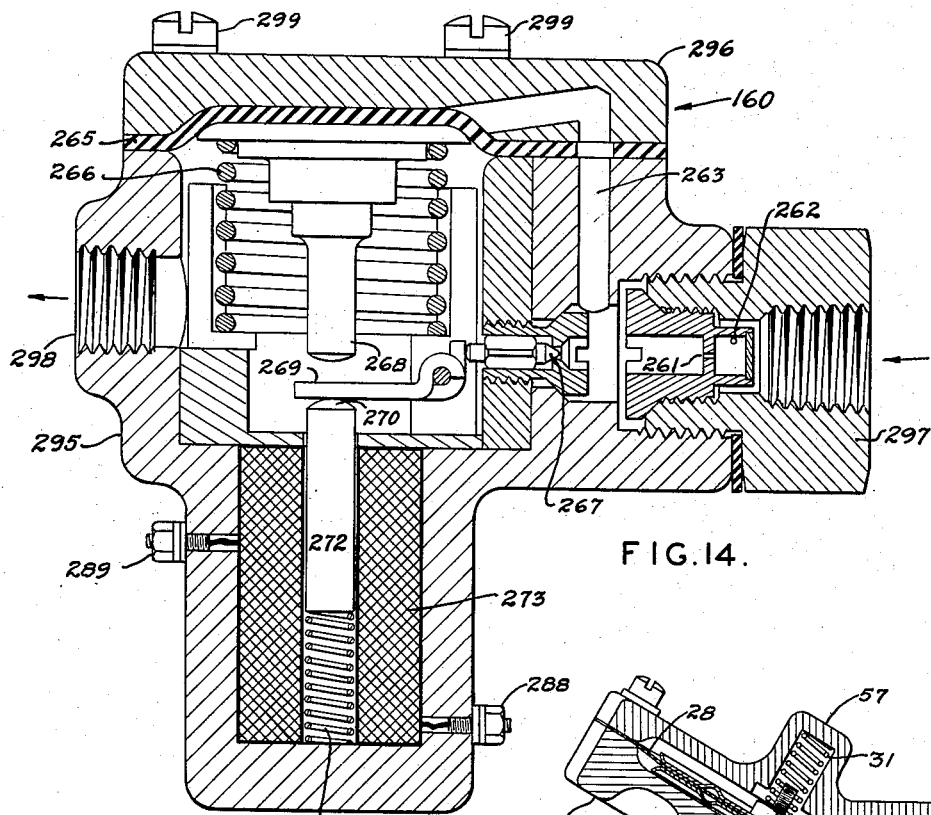
Figs. 14, 15 and 16 are operational views illustrating a pressure regulator for the datum pressure system in vertical section.
Figure 15:
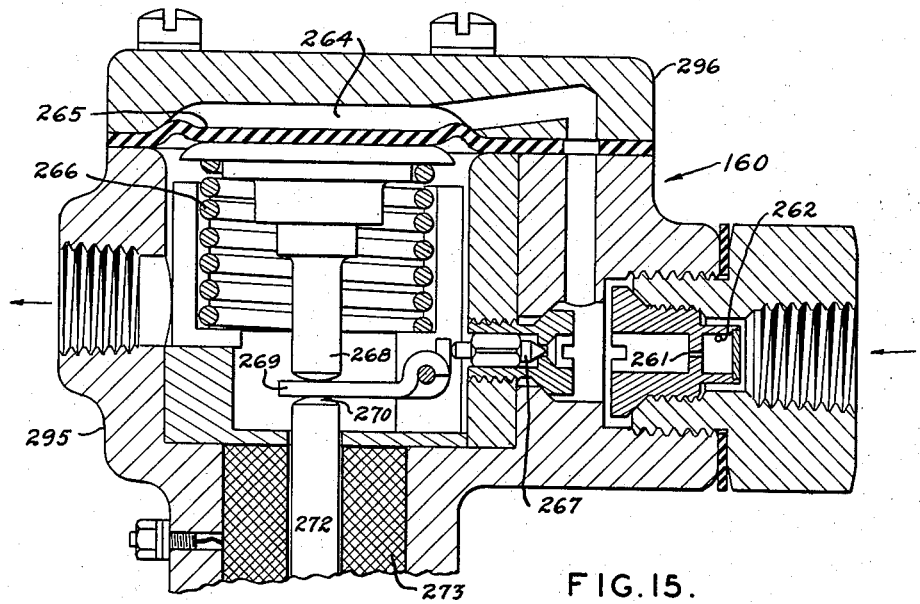
Figure 16:
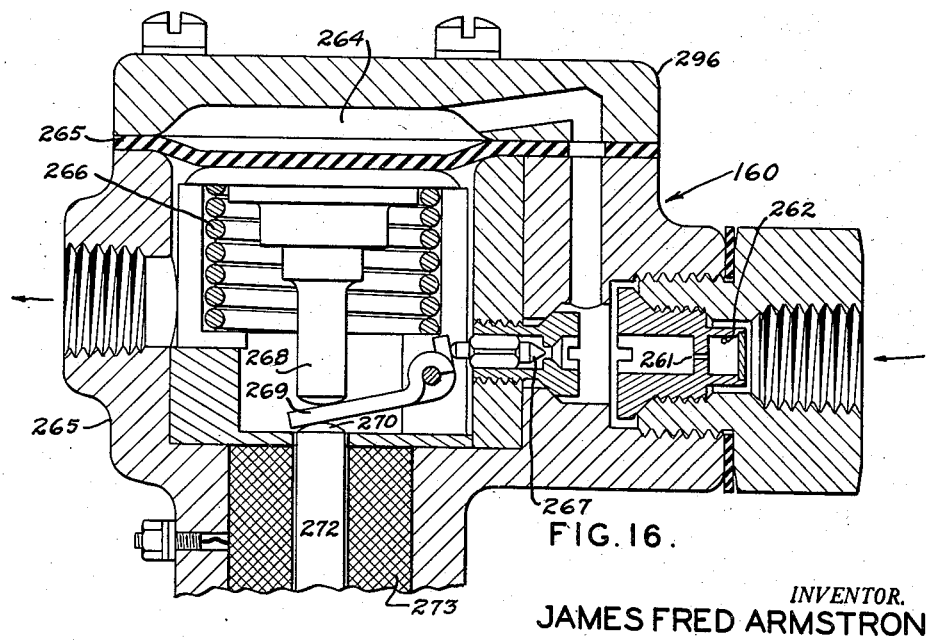

The actual construction of the pressure regulator 160 is shown in Figs. 14 through 16, inclusive. These figures also illustrate the action of the pressure regulator under various operating conditions.

Similar reference characters have been used to identify similar parts which were schematically illustrated and described in Fig. 8.

The body casting of the pressure regulator 160 is provided with a cap 296 secured in place by screws 299, which clamp the diaphragm 265 between the body 295 and the cap 296. The fuel inlet from the datum pressure line 158 is connected at 297, and the outlet 298 connects with the fuel supply.

Within the body portion of the casting is a centrifugal nozzle 262 and metering orifice 261 threadedly mounted within the inlet fitting 297. The pressure regulator valve 267 is operated by a pivoted lever 269, which is, in turn, positioned by the opposing forces exerted thereon from the plunger 268 and the end 270 of plunger 272. The plunger 268, in turn, has an enlarged head held in contact with the undersurface of the diaphragm 265 by a coil spring 266. Plunger 272 is a permanent magnet which is, in turn, operated by the solenoid 273 energized through the connections 289 and 288 to move against the pressure of a coil spring 280. Depending upon the direction of the flow of current through the coil 273, opposite electromotive forces are generated on the plunger 272, either forcing it upwardly to close the valve 267, or downwardly to partially remove the pressure of spring 280 tending to hold the valve 267 closed. In this respect, the solenoid and plunger correspond with and function exactly the same as the armature 272 and electromagnet 273 schematically illustrated in Fig. 8.

Likewise, fuel pressure in the chamber 264 acting on the diaphragm 265 forces the plunger 268 downwardly into contact with the lever 269. When the fuel pressure reaches a predetermined point according to the adjustment of the spring 266, plunger 268 forces lever 269 downwardly against the pressure of spring 280, removing the closing force on the valve 267 so that fuel can pass from the downstream side of the metering orifice 261 out of the outlet 298. This action of the device is illustrated in Fig. 15, which shows the valve 267 slightly cracked in order to let the fuel leak through to the outlet 298. It will be understood that the flows through the metering restriction 261 are very small and amount to four to six pounds or so an hour. Consequently, the amount of valve opening necessary under these conditions is very slight.

When the engine is not operating, spring 266 expands, forcing the fuel out of the chamber 264 and back into the datum line 158 so as to loop the diaphragm 128 in the nozzles 125 in a direction to apply a positive closing force on these valves. The chamber 264, therefore, forms a reservoir of fuel which will be greater than the fuel necessary to displace all of the diaphragms 128 in the valve closing direction. This function is a very important one for the pressure regulator 160 because, if the nozzle valves are open any substantial amount, the diaphragms 28 and 128 will displace a considerable volume of fuel which will have to be replaced by the pumping action of the diaphragm 265 in the chamber 264 so as to move the valves 125 to fully seated position.

Of course, the solenoid 273 performs the same function in the system as the electromagnet previously described in Fig. 8, and, since it functions in the same manner for the same result, a repetition of the description of operation does not appear necessary.

Fig. 16 illustrates the position of the parts of the device to provide the priming for starting. As was previously pointed out, energization of the solenoid 273 occurs when the throttle is partly open and the flow of current is in the proper direction to compress the spring 280 by magnetic forces acting on the armature 272. This opens the valve 267 to lower the datum pressure and give a temporary enrichment during cranking.

*Constructional details of starting enrichment device*

Fig. 25 illustrates the construction now contemplated for the air horn B to incorporate therein the starting device described heretofore. In other respects the construction is the same as in my prior patent application, above identified.

On the shaft 136 of the air valve 137 is rigidly mounted an actuating arm 300. This end of the shaft rotatably carries an arm 301 with a slotted hub receiving one end of a thermostat coil spring 302. A link 304 connects the arm 301 with a piston 305 in a cylinder 306. The passage 308 communicates the suction from posterior of the throttle 150 to the cylinder 306. The wall of the cylinder 306 may be slotted as illustrated, so that a constant circulation of warm air is produced through the housing 310 from a suitable source of heat on the engine, as heretofore described. The wall of the housing 310 carries a suitable stop 311 positioned to adjustably limit the closed position of the air valve 137.

The hub of the arm 300 is formed as a fast idle cam 316 which cooperates with a plunger 312 mounted in the side wall of the housing 310. A spring 313 retracts the plunger from contact with the fast idle cam 316 when the throttle is open. Throttle arm 152 has a stop 315 for contacting the outer end of the plunger 312, forcing the stop toward the cam.

Fig. 25 illustrates the parts in the starting position when the engine is cold. Under these conditions, the thermostat end 303 is in contact with the arm 300, and, due to the lower temperature, exerts a force acting on the arm 300 which is sufficient to move the air valve 137 to an open position. Throttle 150 has also been opened slightly to the starting position, so that plunger 312 is retracted from contact with the fast idle cam 316, thus allowing rotation of the air valve by the thermostat. This is the approximate position of the parts during a cold start, and the throttle must be open slightly during cranking in order to obtain sufficient air for starting.

In Fig. 26, the position of the parts is illustrated after the engine has started and the throttle 150 returned to idle position. Under these conditions, suction acting on the piston 305 partially overcomes the tension exerted by the thermostat 302 returning the air valve slightly from the position shown in Fig. 25. The throttle has also been closed, forcing the plunger into contact with fast idle cam 316, which holds the throttle cracked sufficiently to furnish the proper air for idling during the engine warm-up.

Modified form of airflow sensing device

Figure 21:
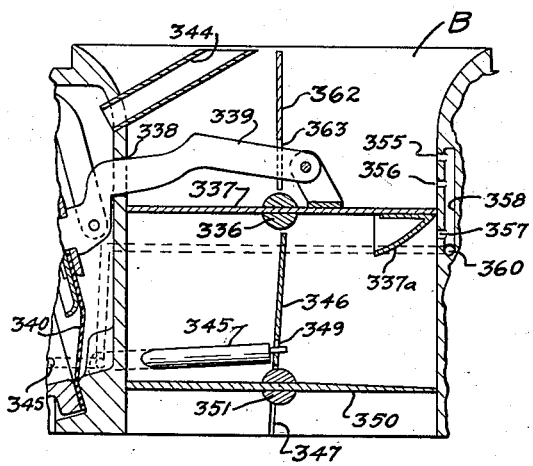
Figs. 21 and 22 are views in vertical section through an air horn illustrating a modified construction of Fig. 9.
Figure 22:
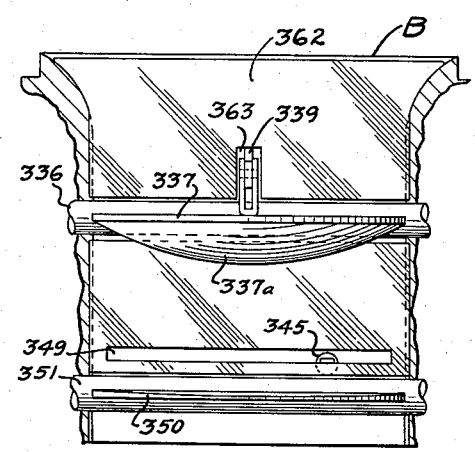

Figs. 21 and 22 illustrate a modification of the air horn B heretofore described and illustrated in Figs. 9 through 12. (The same parts are indicated by the same reference numbers preceded by 300.) In this form, the air horn B mounts a rotatable shaft 336 upon which is mounted the air valve 337. The air valve is operated by a servo-motor such as that previously described, having a diaphragm 340 which is connected mechanically to the air valve 337 by a control rod 339 projecting through a slot 338 in the wall of the air conduit B. The rod 339 is so shaped as to prevent substantial leakage through the slot 338.

Power to operate the servo-motor is communicated to chambers on opposite sides of the diaphragm 340 by an impact tube 344 upstream and a pitot tube 345 downstream of the air valve 337.

Below the air valve is a suitable throttle valve 350 mounted on throttle shaft 351, and a partition 346 extends between the throttle valve shaft and the air valve shaft. This partition is slotted as at 349 in the same manner as heretofore described in Fig. 10.

Above the air valve shaft is a second partition or baffle 362 slotted at 363 to receive the operating rod 339. The underside of the leading edge of the air valve 337 mounts a deflector or spoiler 337a, and this in turn affects the airflow over a series of ports 355, 356 and 357 in the wall of the air conduit B which are interconnected by a passage 358. A passage 360 connects with the passage 345 leading to the back side of the diaphragm 340.

Operation of modified form of airflow sensing device

As in the prior described devices, the diaphragm arrangement for operating the air valve can be termed a servo-motor which, in turn, receives its power from the total pressure drop across the valve which it operates. In this modification, the total pressure drop is a measure of both the dynamic and the static pressure drop across the valve. By measuring flow in this manner it is possible to apply exactly the right amount of power from the servo-motor to overcome the torque produced on the valve by the dynamic flow, so as to properly position the valve for each change in the rate of airflow.

This modification has two added features not shown by that in Fig. 10, and the operation of these will be described hereinafter.

Operation of top baffle

Above the air valve shaft 336 is a baffle 362 parallel with the shaft and extending to the opening in the air horn B. This baffle performs a division of the flow on opposite sides of the air valve and therefore prevents any cross-flow over the top of the air valve from the right-hand side to the left-hand side as the valve opens. Consequently, all of the air that enters on the right-hand side of the partition or baffle 362 must pass around the leading edge of the air valve 337. This will cause a substantial increase in velocity across the air sensing ports 355, 356, and 357, and consequently a strong boost in suction acting on the diaphragm in a valve opening direction. This effect will take place between the critical angles of 55° and 57°, and thereby aid the action of the deflector 337a, the function of which was explained heretofore. In other ranges of operation of the air valve 337, these ports will have little marked effect upon the operation of the servo-motor, and consequently on the angular indication of the air valve.

For example, in the closed position, any difference in pressure adjacent the ports 355, 356 and 357 will be canceled out by their equalizing effect on one another. In the wide-open position, the deflector 337a moves beyond these ports, so that they likewise become neutral in effect.

The port system just described is accordingly regarded as a means for compensating the output torque of the servo-motor to compensate for irregularities in the torque curve of the air valve 337.

For purposes of illustration, a structure has been described which will fulfill all the objects of the invention, but it is contemplated that alternative constructions will occur to those skilled in the art which come within this invention as defined by the appended claims.

I claim:

1. In an engine charge forming device having an air conduit with an air inlet and air outlets connected with the combustion chambers of the engine, a fuel chamber receiving fuel under pressure and delivering fuel under pressure to the combustion chambers of the engine through separate branches, and a system for maintaining the flow of fuel proportional to the flow of air, said system comprising: a disk valve in said inlet, a pivot about which said valve is hinged for swinging movement to form a variable airflow restriction in said inlet, a deflector surface on the leading edge of said valve relative to the direction of airflow to said engine, said deflector surface being positioned on said valve to coact with the air stream and the wall of said inlet so as to modify the slope of the curve representing opening torque for the valve, a motor connected to operate said valve to vary the open area of said airflow restriction, a means sensitive to pressures in the air stream passing the valve for controlling the power output of said motor for determining the position of said valve in the air stream in response to changes in pressure sensed, and fuel metering means in said branches operated by changes in position of said valve.

2. In an engine charge forming device having an air conduit with an air inlet and air outlets connected with the combustion chambers of the engine, a fuel chamber receiving fuel under pressure and delivering fuel under pressure to the combustion chambers of the engine through separate branches, and a system for maintaining the flow of fuel proportional to the flow of air, said system comprising: a disk valve in said inlet, a pivot about which said valve is hinged for swinging movement to form a variable airflow restriction in said inlet, a deflector surface on the leading edge of said valve relative to the direction of airflow to said engine, said deflector surface being positioned on said valve to coact with the air stream and the wall of said inlet so as to modify the slope of the curve representing opening torque, a motor connected to operate said valve to vary the open area of said airflow restriction, a means sensitive to velocity of the air stream passing the valve for controlling the power output of said motor to determine the position of said valve in the air stream in response to changes in velocity sensed, and fuel metering means in said branches operated by changes in position of said valve.

3. In an engine charge forming device having an air conduit with an air inlet and air outlets connected with the combustion chambers of the engine, a throttle in said inlet, a fuel chamber receiving fuel under pressure and delivering fuel under pressure to the combustion chamber of the engine through separate branches, and a system for maintaining the flow of fuel proportional to the flow of air, said system comprising: a disk valve in said inlet anterior of said throttle, a pivot about which said valve is hinged for swinging movement to form a variable airflow restriction in said inlet, a deflector surface on the leading edge of said valve relative to the direction of airflow to said engine, said deflector surface being positioned on said valve to coact with said air stream and the wall of said inlet so as to modify the slope of the curve representing opening torque, a motor connected to operate said valve to vary the open area of said airflow restriction, a means sensitive to the pressures in the air stream passing the valve and operative in response to throttle movement for controlling the source of power for operating the servomotor to determine the position of said valve in the air stream in response to changes in pressure sensed, and fuel metering means in said branches operated by changes in position of said valve.

4. In an engine charge forming device having an air conduit with an air inlet and air outlets connected with the combustion chambers of the engine, a throttle in said air inlet, a fuel chamber receiving fuel under pressure and delivering the fuel under pressure to the combustion chambers of the engine through separate branches, and a system for maintaining the flow of fuel proportional to the flow of air, said system comprising: a disk valve in said inlet anterior of said throttle, a pivot about which said valve is hinged for swinging movement to form a variable airflow restriction in said inlet, a deflector surface on the leading edge of said valve relative to the direction of airflow to said engine, said deflector surface being positioned on said valve to coact with said air stream and the wall of said inlet so as to modify the slope of the curve representing opening torque of said valve, a motor connected to operate said valve to vary the open area of said airflow restriction, a means sensitive to the pressures in the air stream passing the valve and responsive to throttle position for controlling the source of power for operating the said motor to determine the position of said valve in the air stream in response to changes in pressure sensed, means in said inlet between said valve and said throttle providing uniform air valve response independent of throttle position, and fuel metering means in said branches operated by changes in position of said valve.

5. In an engine charge forming device having an air conduit with an air inlet and air outlets connected with the combustion chambers of the engine, a throttle in said inlet, a fuel chamber receiving fuel under pressure and delivering fuel under pressure to the combustion chambers of the engine through separate fuel passages, and a system for maintaining the flow of fuel proportional to the flow of air, said system comprising: a disk valve in said inlet, a pivot about which said valve is hinged for swinging movement to form a variable airflow restriction in said inlet, a deflector surface on the leading edge of said valve relative to the direction of airflow to said engine, said deflector surface being positioned on said valve to coact with the air stream and the wall of said inlet so as to modify the slope of the curve representing opening torque, a motor connected to operate said valve to vary the open area of said airflow restriction, a means sensitive to the pressures in the air stream passing the valve for controlling the power output of said motor to determine the position of said valve in the air stream in response to changes in pressure sensed, fuel metering means of the variable area type in each of said branches operated by changes in position of said valve so that simultaneous changes in area occur in both said air and fuel restrictions, and pressure regulator means in each of said branches downstream of said fuel metering means, each of said pressure regulator means including a nozzle, a valve seat, a movable valve on said seat having a pintle forming with said nozzle a metering restriction for low rates of fuel flow whereby minimum rates of fuel flow are metered by varying the pressure drop across said nozzle, and larger rates of flow are metered by changes in area of said metering means at a regulated pressure drop.

6. In an engine charge forming device for an engine having an air conduit with an air inlet and separate air outlets connected with the combustion chambers of the engine, a throttle in said inlet, a fuel chamber receiving fuel under pressure and delivering fuel under pressure to the combustion chambers of the engine through separate fuel branches, and a system for maintaining the flow of fuel proportional to the flow of air, said system comprising: a disk valve in said inlet, a pivot about which said valve is hinged for swinging movement to form a variable airflow restriction in said inlet, a deflector surface on the leading edge of said valve relative to the direction of airflow to said engine, said deflector surface being positioned on said valve to coact with the air stream and the wall of said inlet so as to modify the slope of the curve representing opening torque for the valve, a motor connected to operate said valve to vary the open area of said airflow restriction, a means sensitive to the pressures in the air stream passing the valve for controlling the power output of said motor to determine the position of said valve in the air stream in response to changes in pressure sensed, engine temperature responsive means associated with said valve for exerting a torque on said valve in an opening direction at low engine temperatures to vary the position of said valve in the air stream as determined by the action of said motor, a suction operated means for modifying the action of said temperature responsive means when said engine begins to operate under its own power, and fuel metering means in each of said branches operated by changes in the position of said valve.

7. In an engine charge forming device for an engine having an air conduit with an air inlet and separate air outlets connected with the combustion chambers of the engine, a throttle in said inlet, a fuel chamber receiving fuel under pressure and delivering fuel under pressure to the combustion chambers of the engine through separate fuel branches, and a system for maintaining the flow of fuel proportional to the flow of air, said system comprising: a disk valve in said inlet, a pivot about which said valve is hinged for swinging movement to form a variable airflow restriction in said inlet, a deflector surface on the leading edge of said valve relative to the direction of airflow to said engine, said deflector surface being positioned on said valve to coact with the air stream and the wall of said inlet so as to modify the slope of the curve representing opening torque for the valve, a motor connected to operate said valve to vary the open area of said airflow restriction, a means sensitive to the pressures in the air stream passing the valve for controlling the power output of said motor to determine the position of said valve in the air stream in response to changes in pressure sensed, fuel metering means in each of said fuel branches operated by changes in position of said valve, pressure regulator means in each of said branches downstream of each of said fuel metering means, a fuel conduit connected with said fuel chamber and each of said pressure regulating means, means for establishing a datum pressure in said fuel conduit including means for throttling the flow therethrough, a datum pressure regulator in said fuel conduit regulating the discharge pressure therefrom, and throttle operated means for controlling the action of said pressure regulator in different throttle positions for lowering and raising the regulated pressure for priming the engine during starting or unloading the engine of excess fuel during cranking, respectively.

8. In an engine fuel charging system of the pressure type having a fuel inlet, a fuel outlet for discharging fuel to the engine, a pump supplying fuel under pressure to said inlet, a fuel line normally pressurized from said pump connecting said inlet and said outlet, a datum pressure system, means establishing a controlled pressure in said datum system proportional to the fuel supply pressure, a pressure regulator having a movable wall controlling a valve at the outlet of said fuel line and opposed expansible chambers separated by said wall and connected with said datum system and said fuel line, respectively, whereby the movement of said wall to open and close said valve varies the fuel capacity of said chambers and maintains the fuel in said fuel line at a pressure proportional to the control pressure in said datum system, the combination of means for retaining said system completely pressurized regardless of operation of said pump, said pressure retaining means comprising a pressurized expansible chamber directly connected with said datum system, said chamber having a capacity at least equal to the displacement necessary to fully expand the chamber in said pressure regulator connected with said datum system to maximum capacity to thereby securely close said valve when the pump ceases operation.

9. In an engine charge forming device having a system for maintaining the flow of fuel to the engine in a plurality of streams proportional to the flow of air to the engine in a separate stream, said device comprising means for measuring the flow of air to the engine, means for measuring the flow of fuel to the engine in all of said streams, a connection between said measuring means to maintain the flow through each stream proportional to the other, and an engine temperature responsive means in said connection for changing the proportions of fuel flow to air flow.

10. In an engine charge forming device having a system for maintaining the flow of fuel to the engine in one stream proportional to the flow of air to the engine in a separate stream, said device comprising, a throttle controlling the flow of air to the engine, a variable capacity air metering means for measuring the airflow past said throttle, means for varying the capacity of said air metering means to maintain the rate of airflow therethrough within a given range at different engine speeds and throttle openings, a second variable capacity metering means in said fuel stream operated directly by changes in capacity of said variable capacity air metering means whereby the capacity of both metering means are increased or decreased together, and engine temperature responsive means acting at low engine temperatures on said variable capacity air metering means to lower the rate of air flow maintained at certain engine speeds and throttle openings to increase the proportion of fuel flow to airflow at low engine temperatures.

11. In an engine charge forming device having a system for maintaining the flow of fuel to the engine in one stream proportional to the flow of air to the engine in a separate stream, said device including a first variable area orifice in said air stream, a motor connected to said orifice in the air stream for changing the area thereof, a means sensitive to the pressures in the air stream passing the valve for controlling the power output of said motor to determine the posiiton of said valve in the air stream in response to changes in pressure sensed, so that the valve position changes with each change of rate of air flow to the engine, and a second variable orifice in said fuel stream operated by changes in position of said first orifice; the combination of engine temperature responsive means exerting a force at low temperatures tending to open said first variable area orifice to increase the fuel flow through said second variable orifice.

12. In an engine charge forming device having a system for maintaining the flow of fuel in one stream proportional to the flow of air in another stream, including an air valve in said second stream forming a variable orifice, a motor connected to said valve for changing the area of the orifice in the air stream, a means sensitive to the pressures in the air stream passing the valve for controlling the power output of said motor to determine the position of said valve in the air stream in response to changes in pressure sensed, so that the valve position changes wtih each change in the rate of airflow to the engine, and a variable capacity fuel metering means in said first stream operated by changes in position of said valve, the combination of means for varying the proportion of airflow to fuel flow in response to changes in engine temperature, said means comprising engine temperature responsive means connected with said valve and urging the valve in an opening direction at low temperatures, and means responsive to the operation of said engine acting to modify the action of said engine temperature responsive means.

13. A device for measuring the rate of airflow through an engine air induction system having a throttle, comprising a valve device in the system upstream of the throttle, a movable mounting for said valve arranged with respect thereto so that airflow to the engine tends to close the valve, a deflector surface on the leading edge of said valve relative to the direction of airflow to said engine, said deflector surface being positioned on said valve to coact with the air stream and adjacent parts of said induction system so as to modify the slope of the curve representing opening torque for the valve, a motor connected to operate said valve to vary the opening area of said air induction system, a means controlled by said throttle and sensitive to the pressures in the air stream passing the valve for controlling the power output of said motor to determine the position of said valve in the air stream in response to changes in pressures sensed.

14. A device for measuring the rate of airflow through an engine air induction system having a throttle, comprising a valve device in the system upstream of the throttle, a movable mounting for said valve arranged with respect thereto so that airflow to the engine tends to close the valve, a deflector surface on the leading edge of said valve relative to the direction of airflow to said engine, said deflector surface being positioned on said valve to coact with adjacent parts of the air induction system and the air stream passing the valve so as to modify the slope of the curve representing opening torque for the valve, a motor connected to operate said valve to vary the opening area of said air induction system, a means controlled by said throttle and sensitive to the pressures in the air stream passing the valve for controlling the power output of said motor to determine the position of said valve in the air stream in response to changes in pressures sensed, and stationary means between said valve and said throttle controlling the air flow around said pressure sensitive means to eliminate the effect of throttle position on said valve.

15. A device for measuring the rate of airflow through an engine air induction system having a throttle, comprising a valve device in the system upstream of the throttle, a movable mounting for said valve arranged with respect thereto so that airflow to the engine tends to close the valve, a deflector surface on the leading edge of said valve relative to the direction of airflow to said engine, said deflector surface being positioned on said valve to coact with the air stream and adjacent parts of said induction system so as to modify the slope of the curve representing opening torque for the valve, a motor connected to operate said valve to vary the opening area of said induction system, a means sensitive to the pressures in the air stream anterior and posterior of the valve for controlling the power output of said motor to determine the position of said valve in the air stream in response to changes in pressures sensed, and throttle operated means for modifying the action of said pressure sensitive means in the wide-open range of throttle positions.

16. In a fuel injection system for an internal combustion engine having an air induction system with an air inlet, fuel discharge nozzles communicating with the engine combustion chambers, fuel supply means including passages connected to said nozzles, a pump for pressurizing said supply means and normally maintaining fuel under pressure to said nozzles, fuel metering means controlling the flow of fuel from said nozzles, the combination of a movable valve in said air inlet for varying the flow area thereof, an air deflecting surface on said valve contoured to coact with the air stream and the wall of said inlet so as to modify the valve action in response to changes in the rate of airflow, and a connection between said movable valve and said fuel metering means for proportioning the flow of fuel to the flow of air.

17. In a fuel injection system for an internal combustion engine having an air induction system with an air inlet, fuel discharge nozzles communicating with the engine combustion chambers, fuel supply means including passages connecting with said nozzles, a pump for pressurizing said supply means and normally maintaining fuel under pressure to said nozzles, and fuel metering means controlling the flow of fuel from said nozzles, the combination of airflow measuring means for operating said fuel metering means, said airflow measuring means comprising a movable valve in said air inlet for varying the flow area thereof, a motor connected to said valve and said inlet for controlling said valve in response to variations in the rate of airflow through said inlet, an air deflecting surface on said valve coacting with the air stream and the wall of said inlet for assisting the action of said motor, and a connection between said movable valve and said fuel metering means.

18. In a fuel injection system for an internal combustion engine having an air induction system with an air inlet, fuel discharge nozzles communicating with the engine combustion chambers, fuel supply means including passages connected to said nozzles, a pump for pressurizing said supply means and normally maintaining fuel under pressure to said nozzles, and fuel metering means controlling the flow of fuel from said nozzles, the combination of a movable valve in said air inlet for varying the flow area thereof, means located in the air stream and sensitive to changes in the rate of airflow passing said valve for determining the open position of said valve, a throttle valve downstream of said movable valve, means responsive to throttle movement for modifying the action of said means sensitive to changes in the rate of airflow past said valve, and a connection between said movable valve and said fuel metering means.

19. In a charge forming device for an engine having an air conduit with an air inlet and air outlets connected with the combustion chambers of the engine, a throttle in said inlet, a starter motor for said engine, a fuel chamber receiving fuel under pressure and delivering fuel under pressure to the engine, and a control system for maintaining the flow of fuel to the engine proportional to the flow of air through said air conduit, the combination of means for priming the engine during cranking, said means comprising a pressure regulator in said control system for maintaining the flow of fuel to the engine proportional to the flow of air, and a connection between said throttle and said pressure regulator operated by throttle opening only when said starter motor is energized to override said control system and supply the engine with an increase in fuel for priming.

References Cited in the file of this patent
UNITED STATES PATENTS

| | | |
|---|---|---|
| 2,664,872 | Ericson et al. | Jan. 5, 1954 |
| 2,673,556 | Reggio | Mar. 30, 1954 |